US009893939B2

(12) United States Patent
Kim et al.

(10) Patent No.: US 9,893,939 B2
(45) Date of Patent: Feb. 13, 2018

(54) METHOD FOR TRANSMITTING AND RECEIVING SIGNAL RELATED TO MONITORING BY SCEF IN WIRELESS COMMUNICATION SYSTEM AND APPARATUS FOR THE SAME

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 15/077,330

(22) Filed: Mar. 22, 2016

(65) Prior Publication Data
US 2016/0277243 A1    Sep. 22, 2016

Related U.S. Application Data

(60) Provisional application No. 62/136,615, filed on Mar. 22, 2015, provisional application No. 62/141,885, filed on Apr. 2, 2015, provisional application No. 62/143,174, filed on Apr. 5, 2015.

(51) Int. Cl.
*H04L 12/24* (2006.01)
*H04W 24/08* (2009.01)

(52) U.S. Cl.
CPC ......... *H04L 41/0816* (2013.01); *H04W 24/08* (2013.01)

(58) Field of Classification Search
CPC .......................... H04L 41/0816; H04W 24/08
See application file for complete search history.

(56) References Cited

U.S. PATENT DOCUMENTS

| 2016/0044651 | A1* | 2/2016 | Lu | H04W 72/0406 370/329 |
| 2016/0100362 | A1* | 4/2016 | Palanisamy | H04W 52/0212 370/311 |
| 2016/0277243 | A1* | 9/2016 | Kim | H04L 41/0816 |

OTHER PUBLICATIONS

"Enhanced 3GPP system for Machine Type Communications and Internet of Things"; ResearchGate; Sep. 2015; Kunz.*

* cited by examiner

*Primary Examiner* — Benjamin H Elliott, IV
(74) *Attorney, Agent, or Firm* — Birch, Stewart, Kolasch & Birch, LLP

(57) ABSTRACT

A method for transmitting and receiving a signal related to monitoring by a Service Capability Exposure Function (SCEF) in a wireless communication system is disclosed. The method includes receiving a first monitoring request containing first information related to monitoring configuration and deletion from a Service Capability Server/Application Server (SCS/AS), transmitting, to a Home Subscriber Server (HSS), a second monitoring request containing second information related to monitoring configuration and deletion, the second information being generated based on information related to the monitoring configuration and deletion, wherein the second monitoring request contains information indicating whether the second monitoring request is a request for deletion of all the monitoring configuration of a subscriber.

18 Claims, 21 Drawing Sheets

METHOD FOR TRANSMITTING AND RECEIVING SIGNAL RELATED TO MONITORING BY SCEF IN WIRELESS COMMUNICATION SYSTEM AND APPARATUS FOR THE SAME

CROSS-REFERENCE TO RELATED APPLICATIONS

This application claims the benefit of the U.S. Provisional Application Nos. 62/136,615, filed on Mar. 22, 2015, 62/141,885, filed on Apr. 2, 2015 and 62/143,174, filed on Apr. 5, 2015 which is hereby incorporated by references as if fully set forth herein.

BACKGROUND OF THE INVENTION

Field of the Invention

The present disclosure relates to a wireless communication system and, more particularly, to a method for transmitting and receiving a signal related to monitoring by a Service Capability Exposure Function (SCEF) and an apparatus for the same.

Discussion of the Related Art

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

SUMMARY OF THE INVENTION

Accordingly, the present invention is directed to a method for transmitting and receiving a signal related to monitoring by a Service Capability Exposure Function (SCEF) and an apparatus for the same that substantially obviate one or more problems due to limitations and disadvantages of the related art.

An object of the present invention is to provide quickly and efficiently perform deletion and change of monitoring.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting and receiving a signal related to monitoring by a Service Capability Exposure Function (SCEF) in a wireless communication system includes receiving a first monitoring request containing first information related to monitoring configuration and deletion from a Service Capability Server/Application Server (SCS/AS), transmitting, to a Home Subscriber Server (HSS), a second monitoring request containing second information related to monitoring configuration and deletion, the second information being generated based on information related to the monitoring configuration and deletion, wherein the second monitoring request contains information indicating whether the second monitoring request is a request for deletion of all monitoring configuration.

In another aspect of the present invention, a Service Capability Exposure Function (SCEF) for transmitting and receiving a signal related to monitoring in a wireless communication system includes a transceiver, and a processor, wherein the processor is configured to receive a first monitoring request containing first information related to monitoring configuration and deletion from a Service Capability Server/Application Server (SCS/AS), and to transmit, to a Home Subscriber Server (HSS), a second monitoring request containing second information related to monitoring configuration and deletion, the second information being generated based on information related to the monitoring configuration and deletion, wherein the second monitoring request contains information indicating whether the second monitoring request is a request for deletion of all monitoring configuration.

The monitoring deletion related to the second information may be applied before the monitoring configuration is applied.

Monitoring deletion related to the first information may be applied before the monitoring configuration is applied.

The second monitoring request may ensure that the HSS deletes monitoring configuration.

The first information related to the monitoring configuration and deletion may include Request Type and Event Action Type.

The Request Type may be one of Config_All_New indicating that all monitoring configuration shall be configured, Config_All_Removal indicating all monitoring configuration shall be deleted, and Config_Update indicating that only a monitoring event indicated by the Event Action Type shall be changed.

When the second monitoring request is a request for deletion of all the monitoring configuration, the second monitoring request may not contain information on a monitoring event to be deleted.

The Event Action Type may be one of event_add indicating addition of an event, event_remove indicating deletion of an event and event_modify indicating modification of an event.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
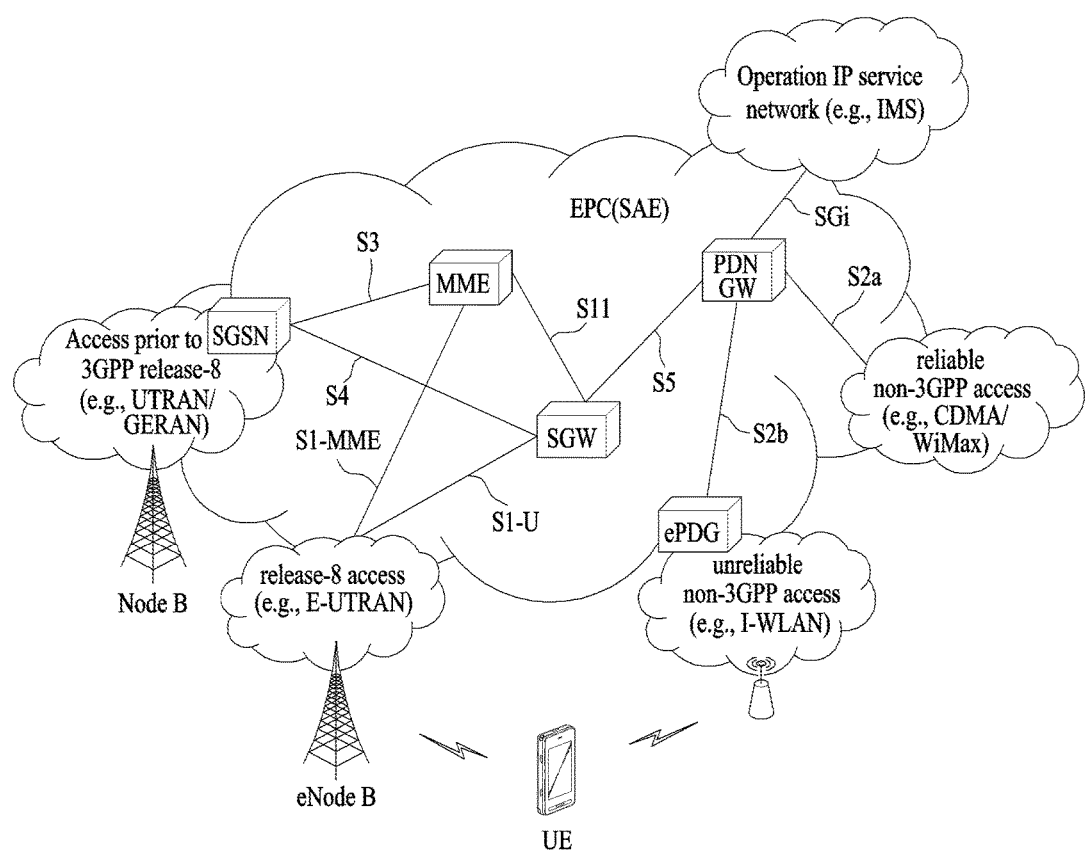
FIG. 1 is a schematic diagram showing the structure of an evolved packet system (EPS) including an evolved packet core (EPC)

The embodiments described below are constructed by combining elements and features of the present disclosure in a predetermined form. The elements or features may be considered optional unless explicitly mentioned otherwise. Each of the elements or features can be implemented without being combined with other elements. In addition, some elements and/or features may be combined to configure an embodiment of the present disclosure. The sequential order of operations described in the embodiments of the present disclosure may be changed. Some elements or features of one embodiment may also be included in another embodiment, or may be replaced by corresponding elements or features of another embodiment.

It should be noted that specific terms employed in the present invention are intended for better understanding of the present invention, and these specific terms may be changed to other forma within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents related to at least one of an institute of electrical and electronics engineers (IEEE) 802-based system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below are applicable to a variety of wireless communication systems. For clarity, the following description focuses on 3GPP LTE and 3GPP LTE-A systems. However, the spirit of the present invention is not limited thereto.

The terms used in this specification are defined as follows.

UMTS (Universal Mobile Telecommunication System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: An eNB of GERAN/UTRAN which is installed outdoors and has coverage of a macro cell scale.

eNodeB: An eNB of E-UTRAN which is installed outdoors and has coverage of a macro cell scale.

UE (User Equipment): A user device. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW: A network node of the EPS network performing functions of UE IP address allocation, packet screening and filtering, and charging data collection.

SGW (Serving Gateway): A network node of the EPS network performing functions of mobility anchor, packet routing, idle mode packet buffering, and triggering of the MME paging the UE.

NAS (Non-Access Stratum): An upper staratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a PDN GW.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

RAN (Radio Access Network): a unit including a NodeB, an eNodeB and an RNC (Radio Network Controller) for controlling the NodeB and the eNodeB in a 3GPP network. The RAN is present between units of UEs and provides connection to the core network.

HLR (Home Location Register)/HSS (Home Subscriber Server): a database containing subscriber information of a 3GPP network. The HSS can perform functions such as configuration storage, identity management and user state storage.

PLMN (Public Land Mobile Network): a network configured for the purpose of providing mobile communication services to individuals. This network can be configured per operator.

Proximity Service (ProSe Service or Proximity based Service): A service enabling discovery between devices physically close to each other, direct communication between the devices, communication between the devices via a base station or a third device. In this case, user plane data is exchanged through a direct data path rather over a 3GPP core network (e.g., EPC).

ProSe communication: Communication between two or more ProSe-enabled UEs through a ProSe communication path. Unless stated otherwise, ProSe communication may refer to one of ProSe E-UTRA communication, ProSe-assisted WLAN direct communication between two UEs, ProSe group communication and ProSe broadcast communication.

ProSe E-UTRA communication: ProSe communication using an E-UTRA communication path.

ProSe-assisted WLAN direct communication: ProSe communication through a direct communication path.

ProSe communication path: A communication path supporting ProSe communication. The ProSe E-UTRA communication path may be established between ProSe-enabled UEs using E-UTRA or through a local eNB. The ProSe-assisted WLAN direct communication path may be established directly between ProSe-enabled UEs using WLAN.

EPC path (or infrastructure data path): A user plane communication path through EPC ProSe discovery: A procedure of identifying/checking a nearby ProSe-enabled UE using E-UTRA ProSe Group Communication: One-to-many ProSe communication between two or more ProSe-enabled UEs close to each other using a common communication path.

ProSe UE-to-Network Relay: A ProSe-enabled public safety UE serving as a relay between a ProSe-enabled network which uses E-UTRA and a ProSe-enabled public safety UE ProSe UE-to-UE Relay: A ProSe-enabled public safety UE serving as a ProSe communication relay between two or more ProSe-enabled public safety UEs.

Remote UE: A ProSe-enabled public safety UE which does not receive a service through E-UTRAN but is connected to an EPC network through the ProSe UE-to-Network Relay when operating as a UE-to-Network Relay. Namely, The ProSe-enabled public safety UE is provided with PDN connection. When a UE-to-UE Relay operates, the ProSe-enabled public safety UE communicates with another ProSe-enabled public safety UE via the ProSe UE-to-UE Relay.

ProSe-enabled Network: ProSe discovery, A network supporting ProSe communication and/or ProSe-assisted WLAN direct communication. Hereinafter, the ProSe-enabled Network will be simply referred to as a network.

ProSe-enabled UE: A UE supporting ProSe discovery, ProSe communication and/or ProSe-assisted WLAN direct communication. Hereinafter, the ProSe-enabled UE and ProSe-enabled Public Safety UE will be simply referred to as UEs.

Proximity: Satisfying a proximity determination criterion defined for discovery and communication, respectively.

SLP (SUPL Location Platform): An entity that controls Location Service Management and Position Determination. The SLP includes a function of SLC (SUPL Location Center) and a function of SPC (SUPL Positioning Center). For details, see Open Mobile Alliance (OMA) standard document OMA AD SUPL: "Secure User Plane Location Architecture".

USD (User Service Description): A application/service layer transmits TMGI (Temporary Mobile Group Identity) for each MBMS service, session start and end times, frequencies, MBMS service area identities (MBMS SAIs) information belonging to an MBMS service area and the like to the UE through the USD. For details, see 3GPP TS 23.246.

ISR (Idle mode Signalling Reduction): If a UE frequently moves between E-UTRAN and UTRAN/GERAN, network resources are wasted according to repetition of a location registration procedure. To reduce waste of resources, if the UE is in the idle mode, the location thereof is registered in the MME and SGSN (hereinafter, referred to as mobility management nodes) respectively via E-UTRAN and UTRAN/GERAN. Thereby, when movement or cell reselection is performed between two pre-registered Radio Access Technologies (RAT), separate location registration is prevented. Accordingly, when DL(downlink) data reaches a corresponding UE, paging may be transmitted over the E-UTRAN and the UTRAN/GERAN simultaneously to successfully find a UE and deliver the DL data [see 3GPP TS 23.401 and 3GPP TS 23.060].

MTC Device (or MTC UE or UE used for MTC or UE configured for MTC): A MTC Device is a UE equipped for Machine Type Communication, which communicates through a PLMN with MTC Server(s) and/or other MTC Device(s). [For details, see 3GPP TS 22.368]

SCS(Services Capability Server): An SCS is an entity which connects to the 3GPP network to communicate with UEs used for MTC and the MTC-IWF in the HPLMN. The SCS offers capabilities for use by one or multiple MTC Applications. [For details, see 3GPP TS 23.682]

MTC-IWF(Machine Type Communications-InterWorking Function): An MTC-IWF hides the internal PLMN topology and relays or translates signaling protocols used over Tsp to invoke specific functionality in the PLMN. [For details, see 3GPP TS 23.682]

SCEF(Service Capability Exposure Function): The key entity within the 3GPP architecture for service capability exposure that provides a means to securely expose the services and capabilities provided by 3GPP network interfaces. [For details, see 3GPP TS 23.682]

MTC Server: A MTC Server is a server, which communicates to the PLMN itself, and to MTC Devices through the PLMN. The MTC Server can also have an interface which can be accessed by the MTC User. The MTC Server can Provides services for other servers (e.g. The MTC Server is a Services Capability Server for an Application Server), and/or Provides services for applications and can host the application (e.g. The MTC Server is an Application Server). [For details, see 3GPP TS 22.368]

MTC User: A MTC User uses the service provided by the MTC Server. [For details, see 3GPP TS 22.368]

MTC Subscriber: A MTC Subscriber is a legal entity having a contractual relationship with the network operator to provide service to one or more MTC Devices. [For details, see 3GPP TS 22.368]

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity.) |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
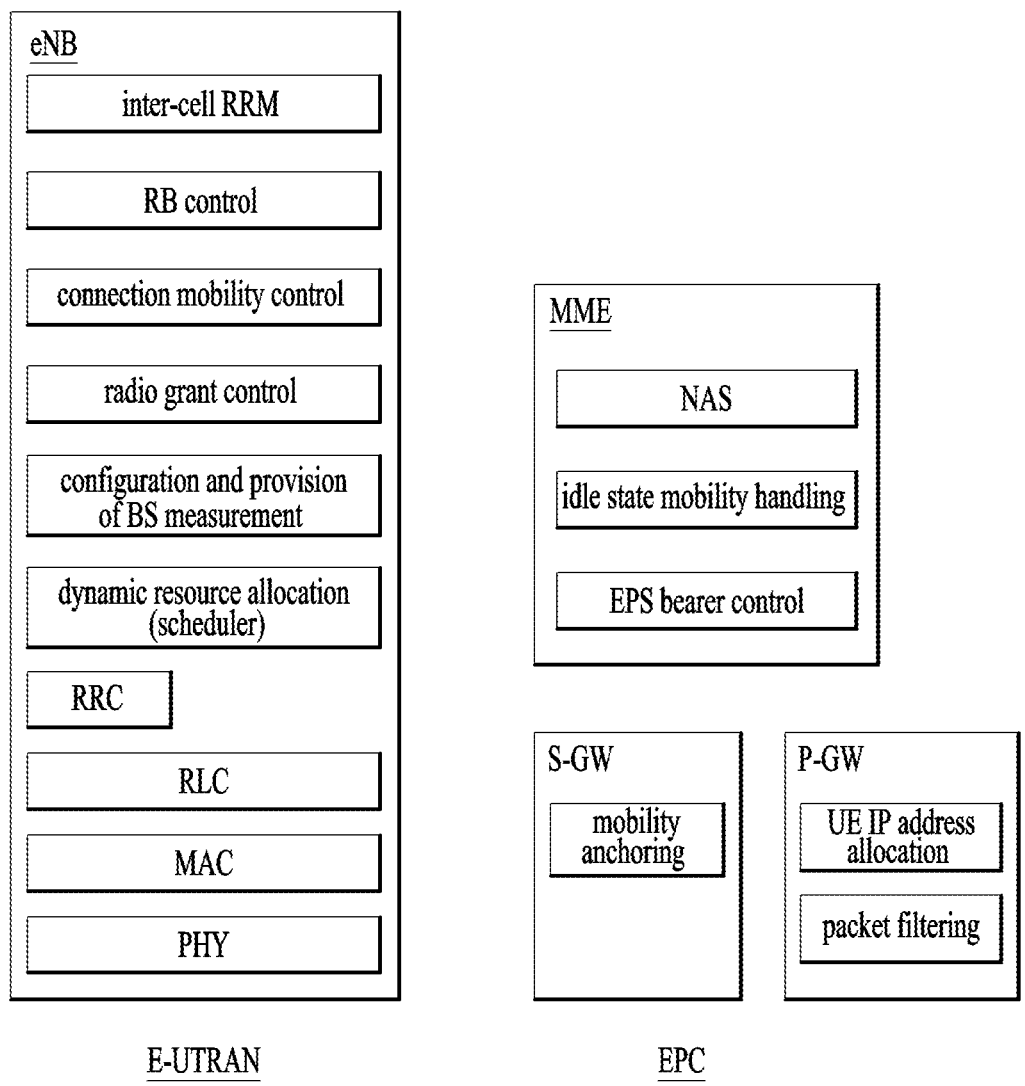
FIG. 2 is a diagram exemplarily illustrating architectures of a typical E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
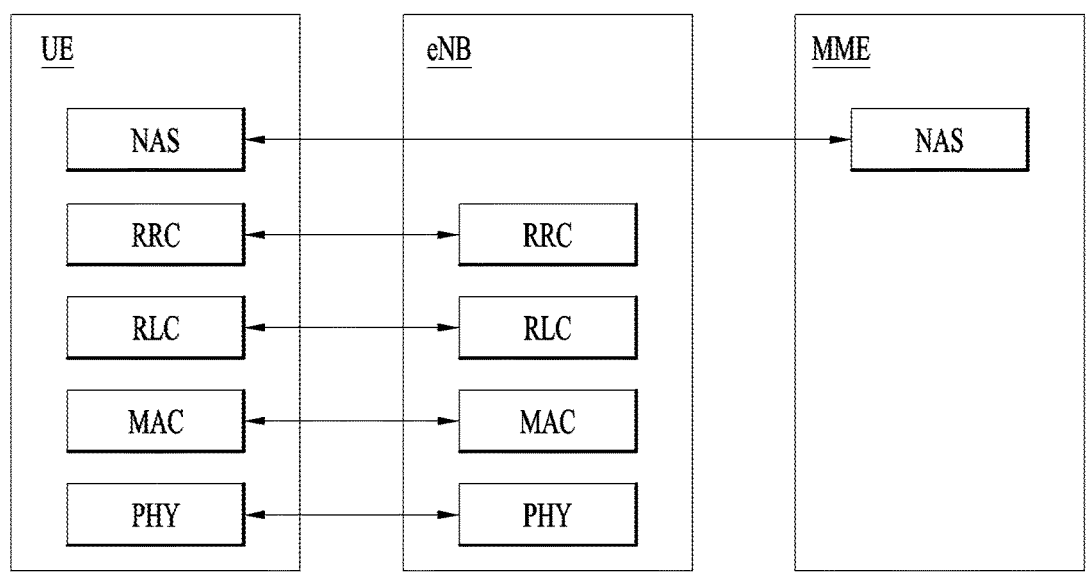
FIG. 3 is a diagram exemplarily illustrating the structure of a radio interface protocol in a control plane.
Figure 4:
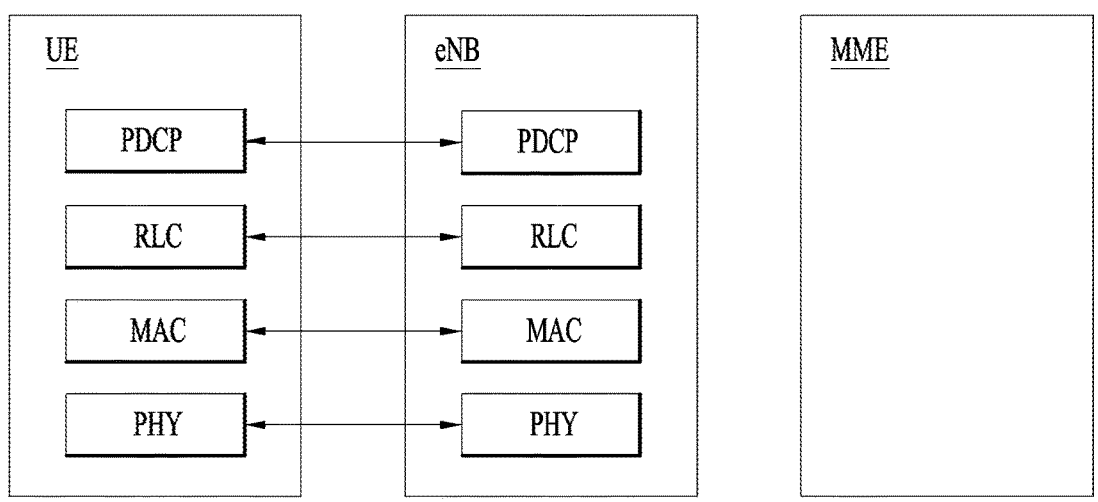
FIG. 4 is a diagram exemplarily illustrating the structure of an radio interface protocol in a user plane.

FIG. 3 is a diagram exemplarily illustrating the structrure of a radio interface protocol in a control plane between a UE and a base station, and FIG. 4 is a diagram exemplarily illustrating the structrure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
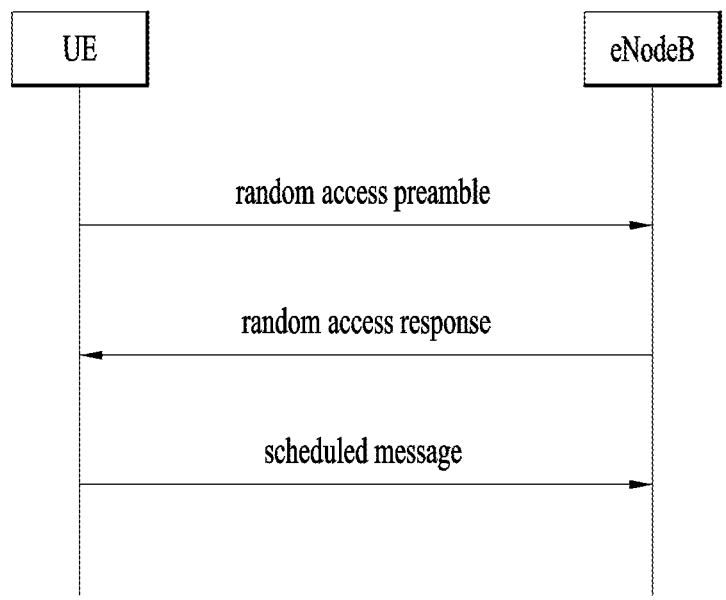
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
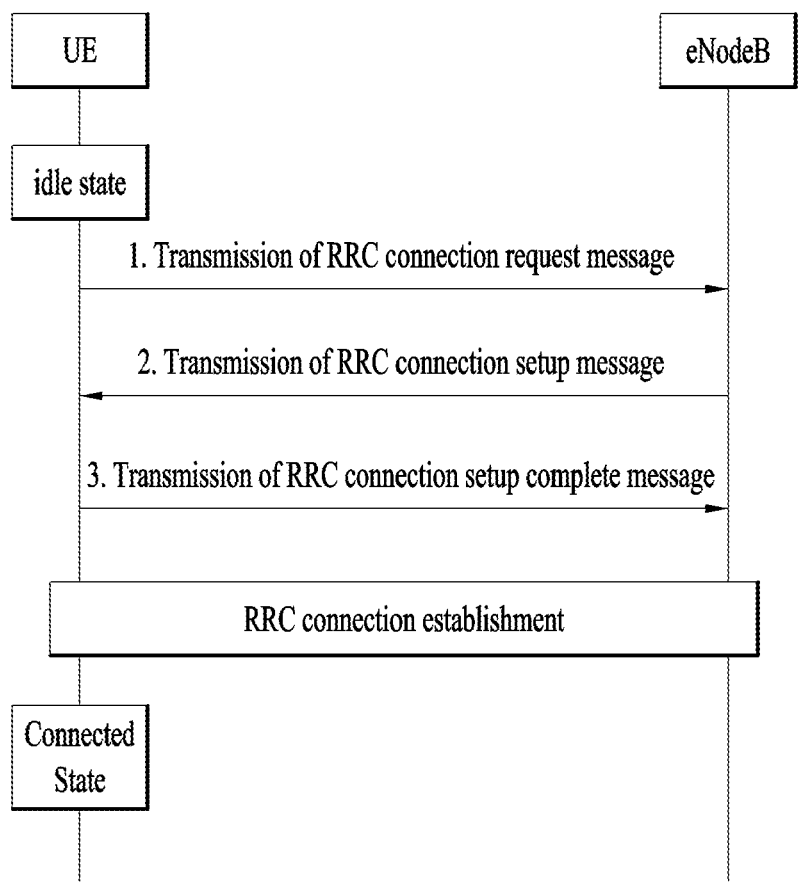
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

Figure 7:
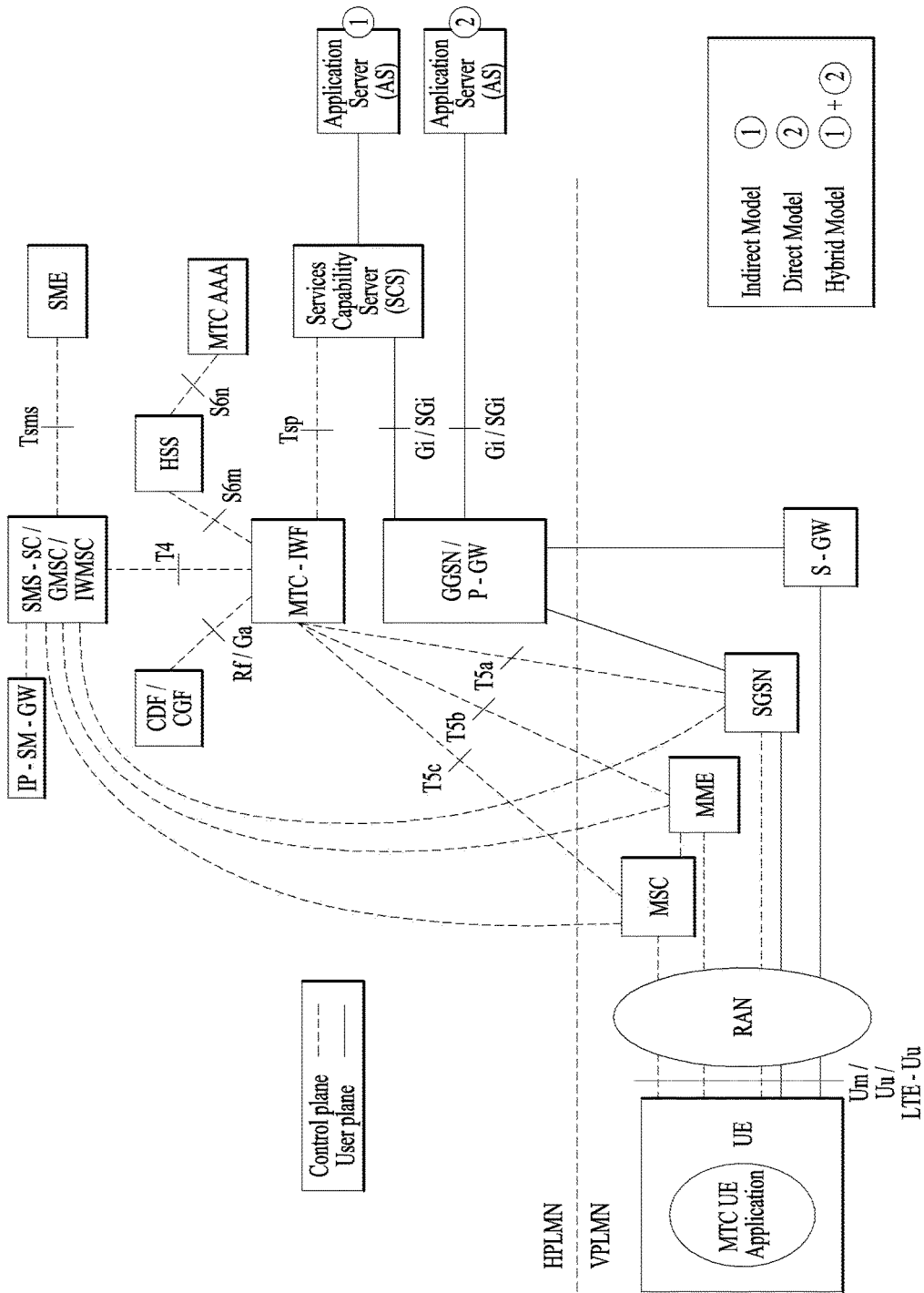
FIG. 7 shows an architecture for MTC communication.
Figure 8:
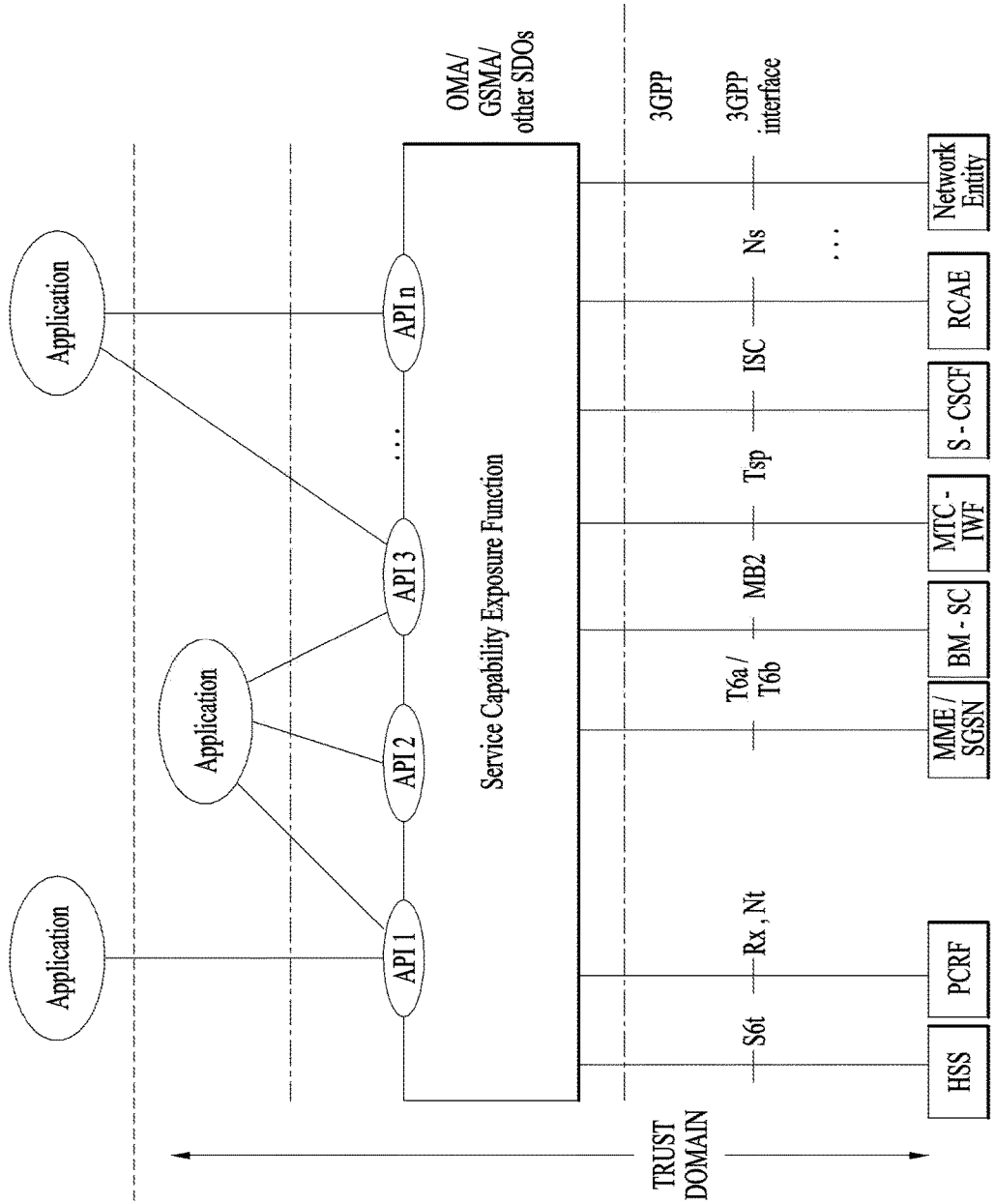
FIG. 8 is a diagram illustrating the structure of an SCEF.

FIG. 7 shows 3GPP Architecture for Machine-Type Communication. FIG. 8 shows the overall architecture for Service Capability Exposure which enables the 3GPP network to securely expose its services and capabilities provided by 3GPP network interfaces to external 3rd party service provider applications.

The Service Capability Exposure Function (SCEF) is the key entity within the 3GPP architecture for service capability exposure that provides a means to securely expose the services and capabilities provided by 3GPP network interfaces. SCEF functionality may be provided by SCS. MTC-IWF may be co-located with SCEF in which case Tsp functionality would be exposed via API. The interface between SCEF and AS or Applications is outside 3GPP scope. Defining interfaces that permit the SCEF to access services or capabilities at either a new or an existing 3GPP Network Element lies within 3GPP scope. The choice of which protocols to specify for such new 3GPP interfaces (e.g. DIAMETER, RESTful APIs, XML over HTTP, etc.) will depend on multiple factors including but not limited to the needs of that specific interface or ease of exposure of requested information.

Figure 9:
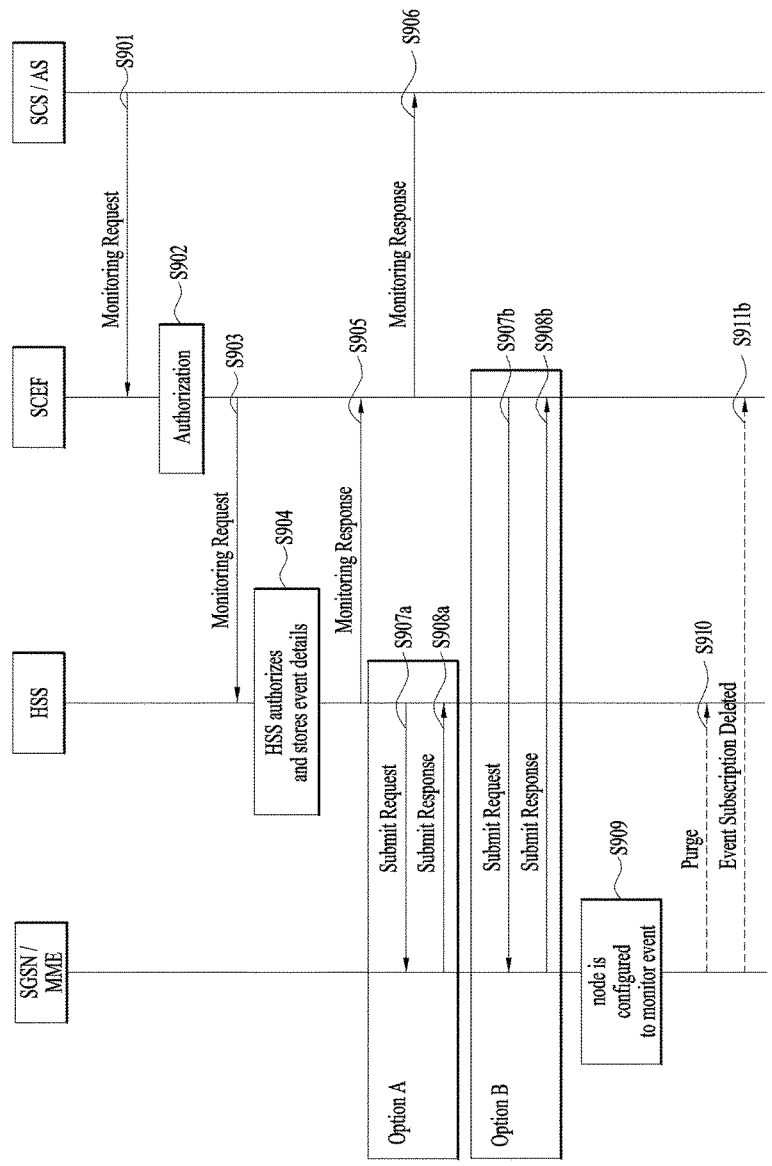
FIGS. 9 to 14 illustrate a monitoring-related procedure according to the conventional art.

FIG. 9 shows a procedure related to monitoring configuration.

In step S901, the SCS/AS sends a Monitoring Request message to the SCEF with the configuration for a particular monitoring event such as Monitoring Event ID and associated parameters, Monitoring Event Priority, Monitoring Destination node etc. In step S902, the SCEF checks that the SCS/AS is authorised to send monitoring requests and that the SCS has not exceeded its quota or rate of submitting monitoring requests. If this check fails the SCEF sends a Monitoring Response message with a cause value indicating the reason for the failure condition and the flow stops at this step.

In step S903, the SCEF sends a Monitoring Request message to the HSS with the monitoring event configuration details (e.g.: Monitoring Event ID). The SCEF stores the Monitoring Event ID, the Monitoring Destination node and possibly other parameters. In step S904, the HSS verifies the monitoring event information. For option A monitoring events are configured in HSS as part of UE subscriber data. In step S905, the HSS sends the Monitoring Response to the SCEF when accepting the Monitoring Request. For option B it includes the address(es) of the serving node(s). In step S906, the SCEF forwards the Response to the SCS/AS. If the cause value from HSS indicates the SCS/AS is not allowed monitor this event or this UE, or there is no valid subscription information a confirm message is sent with a cause value indicating the reason for the failure condition and the flow stops at this step.

In step S907 of option A, the HSS sends a message to MME with the monitoring event data. The UE may be registered with both MME and SGSN, which requires sending Submit Request to both nodes. The Submit Request indicates the monitoring event configuration and the target address for the event report, e.g. the HSS or the SCEF. In step S908 of option A, SGSN/MME on receiving Submit Request configures the monitoring event by generating a Monitoring configuration context. The MME/SGSN confirms the monitoring request submission. The Monitoring configuration context is stored as part of UE context. The target address for the event report (HSS or SCEF) is also stored in the Monitoring configuration context.

In step S907 of option B, based on type of event configuration requested SCEF determines the destination node for the monitoring event based on the information received from SCS and HSS or based on other information. For example in case of monitoring event configuration (or activation/deactivation) at MME, SCEF sends a message to MME with the monitoring event data. The UE may be registered with both MME and SGSN, which requires sending Submit Request to both nodes. The Submit Request indicates the monitoring event configuration and the target address for the event report, i.e. the SCEF address. In step S908 of option B, SGSN/MME on receiving submit request configures the monitoring event by generating a Monitoring configuration context. The MME/SGSN confirms the monitoring request submission. The Monitoring configuration context is stored as part of UE context, if the monitoring event configuration is specific for a UE. The SCEF address is also stored in the Monitoring configuration context. The Monitoring configuration context is exchanged between SGSN/MMEs during mobility procedure (e.g. HO/TAU/RAU), so that the target SGSN/MME can be aware of the Monitoring event trigged by the MM procedure and perform corresponding actions e.g. reporting Monitoring event.

In step S909, the serving node is configured for monitoring. In step S910, when the MME/SGSN deletes the UE's monitoring context due to purging the UE, the HSS knows it when receiving the Purge message. No other signalling is performed in that situation for option A. In step S911, for option B the serving node indicates a deletion of the subscribed monitoring event to the target address for the event report, i.e. to the SCEF.

Figure 10:
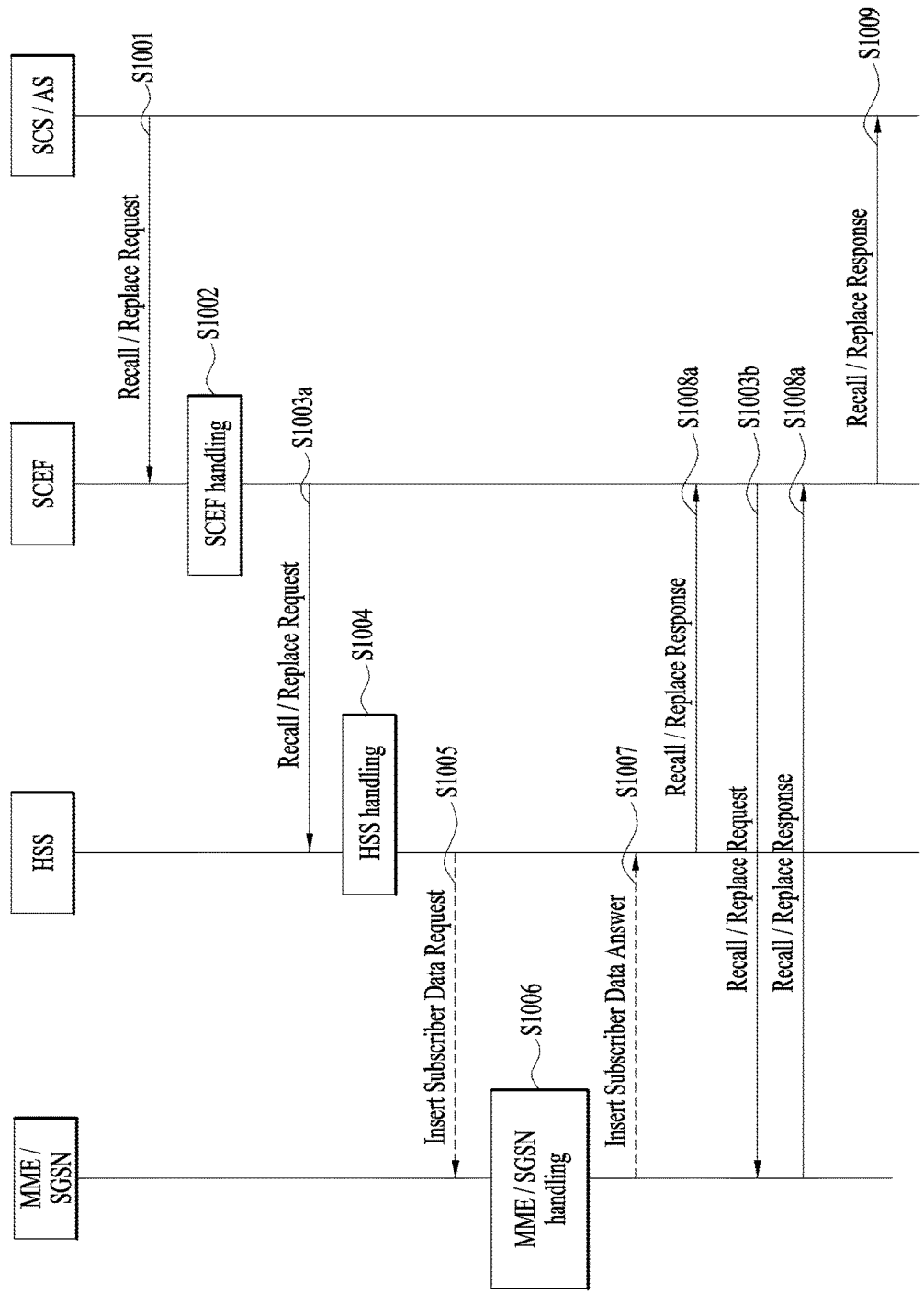

FIG. 10 shows Monitoring Recall flow. In step S1001, the SCS/AS sends a Recall Request (External Identifier(s) or MSISDN(s), SCS/AS Identifier, SCS/AS Reference ID) message to the SCEF. In step S1002, the SCEF checks that the SCS/AS is authorised to recall an earlier monitoring requests and that the related Reference exists. If this check fails the SCEF sends a Monitoring Response message with a cause value indicating the reason for the failure condition and the flow stops at this step. In step S1003a, if the related Monitoring Type is for configuration via HSS, the SCEF sends a Recall Request (External Identifier or MSISDN, SCS/AS Identifier, SCEF Address, SCEF Reference ID) message to the HSS.

In step S1003b, if the related Monitoring Type is for direct configuration at the SGSN/MME, the SCEF sends a Recall Request (SCEF Address, SCEF Reference ID) message to the SGSN/MME. In step S1004, the HSS verifies the recall request information. If this check fails the HSS sends a Recall Response message with a cause value indicating the reason for the failure condition to the SCEF. The SCEF continues with step 8a and indicates a cause value describing the reason for the failure condition. In step S1005, if monitoring contexts need to be deleted from serving nodes, the HSS sends an Insert Subscriber Data Request message to MME and/or SGSN. The included parameters indicate which monitoring type and configuration is to be deleted. In step S1006, the SGSN/MME performs any necessary actions. In step S1007, the SGSN/MME sends an Insert Subscriber Data Answer (Cause) message to the HSS, indicating whether the deletion was successful. In step S1008a, the HSS sends a Monitoring Response (IMSI and/or MSISDN, Cause) message to the SCEF. In step S1008b, the SGSN/MME sends a Recall Response (SCEF Reference ID, Cause) message to the SCEF. In step S1009, the SCEF sends a Recall Response (SCS/AS Reference ID, Cause) message to the SCS/AS.

Figure 11:
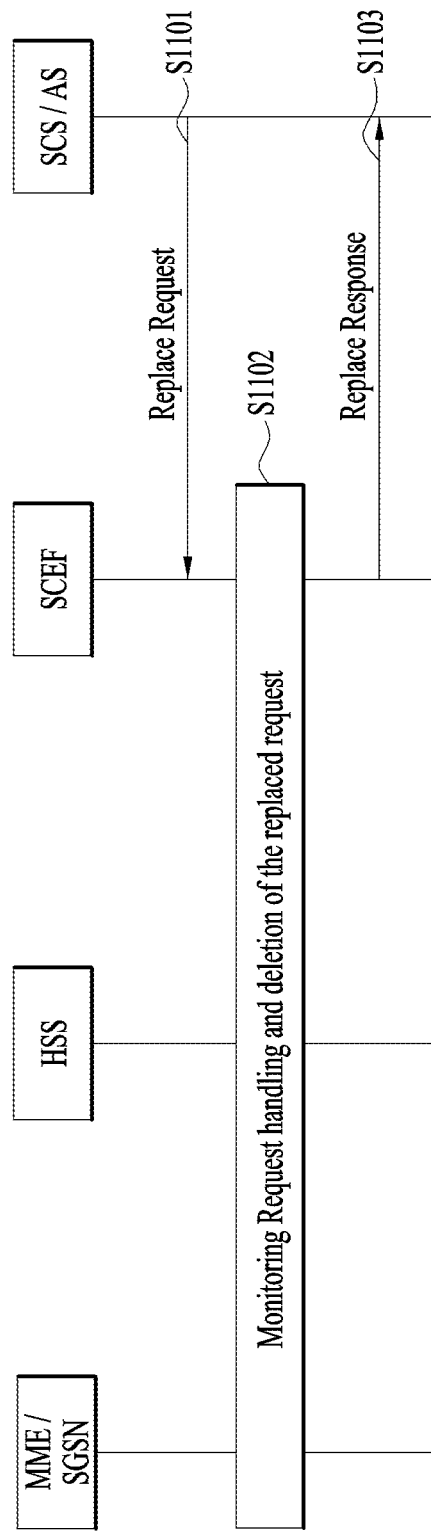

FIG. 11 shows Monitoring Replace Procedure. In step S1101, the SCS/AS sends a Replace Request (External Identifier(s) or MSISDN(s), SCS/AS Identifier, SCS/AS Reference ID, Parameters, SCEF Reference ID) message to the SCEF. The SCEF Reference ID indicates the monitoring request that shall be replaced. All other parameters are as for the Monitoring Request for describing the new request. In step S1102, all further steps are as described for the Monitoring Configuration Flows. In addition provide the Request messages the Reference ID of the earlier request that shall be replaced, if the related message indicates such an ID. And the Response messages indicate by the Cause the result for the replacement. In step S1103, the SCEF sends a Replace Response (SCS/AS Reference ID, Parameters, Cause) message to the SCS/AS. Parameters are provided as for the related Monitoring Request procedure.

Figure 12:
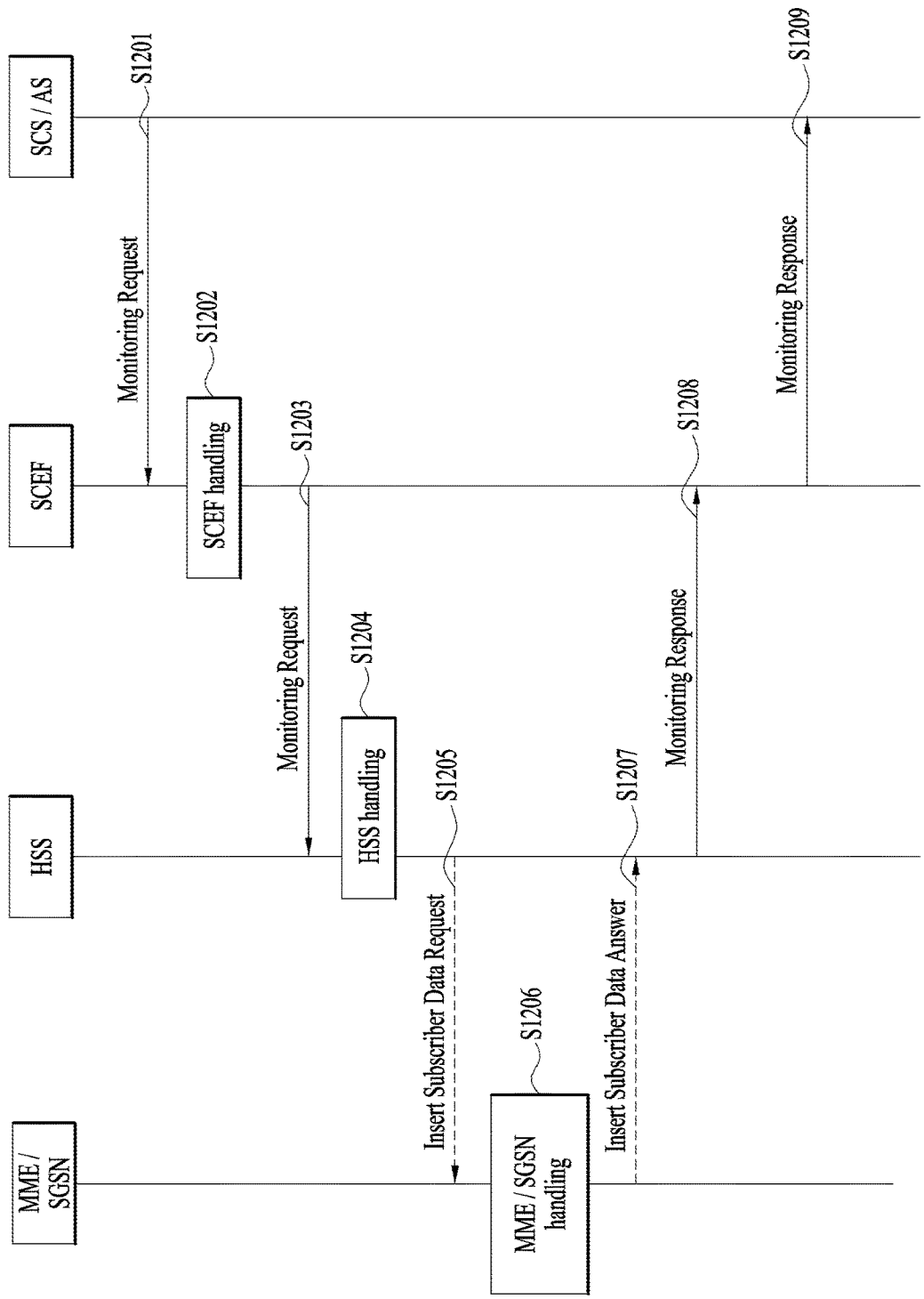

FIG. 12 shows Monitoring configuration flow. In step S1201, The SCS/AS sends a Monitoring Request (External Identifier(s) or MSISDN(s), SCS/AS Identifier, SCS/AS Reference ID, Monitoring Type, Max Number of Reports, Monitoring Duration, Priority, Monitoring Destination Address, Parameters) message to the SCEF. Parameters are provided by the SCS/AS for the Monitoring Request. In step S1202, The SCEF checks that the SCS/AS is authorised to send monitoring requests and that the SCS has not exceeded its quota or rate of submitting monitoring requests. If this check fails the SCEF sends a Monitoring Response message with a cause value indicating the reason for the failure condition and the flow stops at this step. In step S1203, The SCEF sends a Monitoring Request (External Identifier or MSISDN, SCS/AS Identifier, SCEF Address, SCEF Reference ID, Monitoring Type, Max Number of Reports, Monitoring Duration, Priority, Monitoring Destination Address, Parameters) message to the HSS. Parameters are provided by the SCEF for the Monitoring Request.

In step S1204. The HSS verifies the monitoring request information. If this check fails the HSS sends a Monitoring Response message with a cause value indicating the reason for the failure condition to the SCEF. The SCEF sends a Monitoring Response message with a cause value indicating the reason for the failure condition and the flow stops at this step. The HSS stores parameters provided by the SCEF. In step S1205, If a serving node needs to be involved, the HSS sends an Insert Subscriber Data Request message (Parameters) to MME and/or SGSN. Parameters are provided by the HSS for the Monitoring Request. In step S1206, if it is a one-time request the SGSN/MME perform any necessary actions to obtain the monitoring information. If it is a request for continuous monitoring, the SGSN/MME stores parameters provided by the HSS. In step S1207, the SGSN/MME sends an Insert Subscriber Data Answer (Parameters, Cause) message to the HSS. In step S1208, the HSS sends a Monitoring Response (IMSI and/or MSISDN, Parameters, Cause) message to the SCEF. In step S1209, if it is not a onetime request, the SCEF stores a monitoring context identified by the IMSI and/or MSISDN and the SCEF Reference ID. The SCEF sends a Monitoring Response (Monitoring Information, SCEF Reference ID, Parameters, Cause) message to the SCS/AS. Parameters are provided as for the related Monitoring Request procedure.

Figure 13:
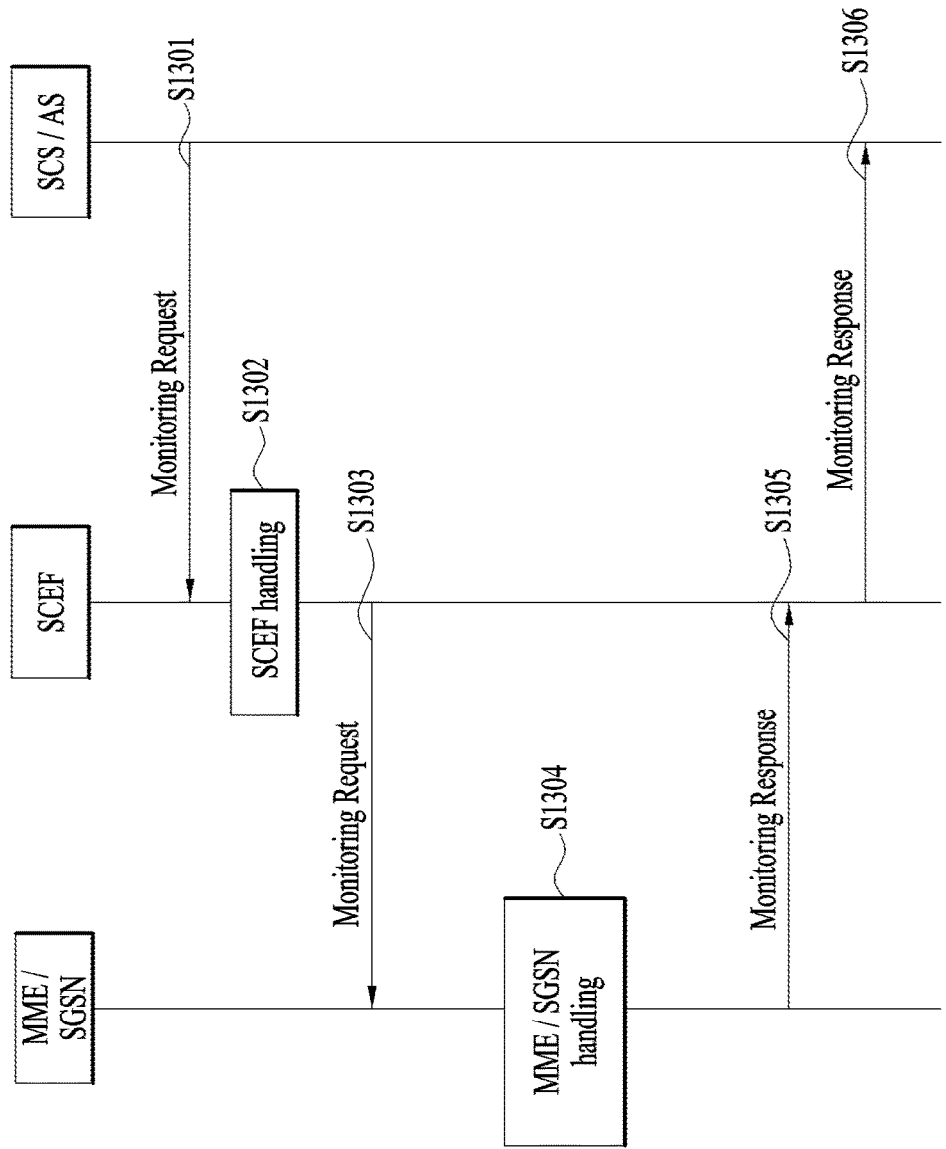

FIG. 13 shows another Monitoring configuration flow at MME/SGSN. In step S1301, The SCS/AS sends a Monitoring Request (External Identifier(s) or MSISDN(s), SCS/AS Identifier, SCS/AS Reference ID, Monitoring Type, Max Number of Reports, Monitoring Duration, Priority, Monitoring Destination Address, Parameters) message to the SCEF. Parameters are provided by the SCS/AS for the Monitoring Request. In step S1302, The SCEF checks that the SCS/AS is authorised to send monitoring requests and that the SCS has not exceeded its quota or rate of submitting monitoring requests. If this check fails the SCEF sends a Monitoring Response message with a cause value indicating the reason for the failure condition and the flow stops at this step. In step S1303, The SCEF sends a Monitoring Request (External Identifier or MSISDN, SCS/AS Identifier, SCEF Address, SCEF Reference ID, Monitoring Type, Max Number of Reports, Monitoring Duration, Priority, Parameters) message to the SGSN/MME. Parameters are provided by the SCEF for the Monitoring Request. In step S1304, If it is a one-time request the SGSN/MME perform any necessary actions to obtain the monitoring information. If it is a request for continuous monitoring, the SGSN/MME stores parameters provided by the SCEF. In step S1305, The SGSN/MME sends a Monitoring Response (IMSI and/or MSISDN, Parameters, Cause) message to the SCEF. In step S1306, if it is not a onetime request, the SCEF stores a monitoring context identified by the IMSI and/or MSISDN and the SCEF Reference ID. The SCEF sends a Monitoring Response (Monitoring Information, SCEF Reference ID, Parameters, Cause) message to the SCS/AS. Parameters are provided as for the related Monitoring Request procedure.

Figure 14:
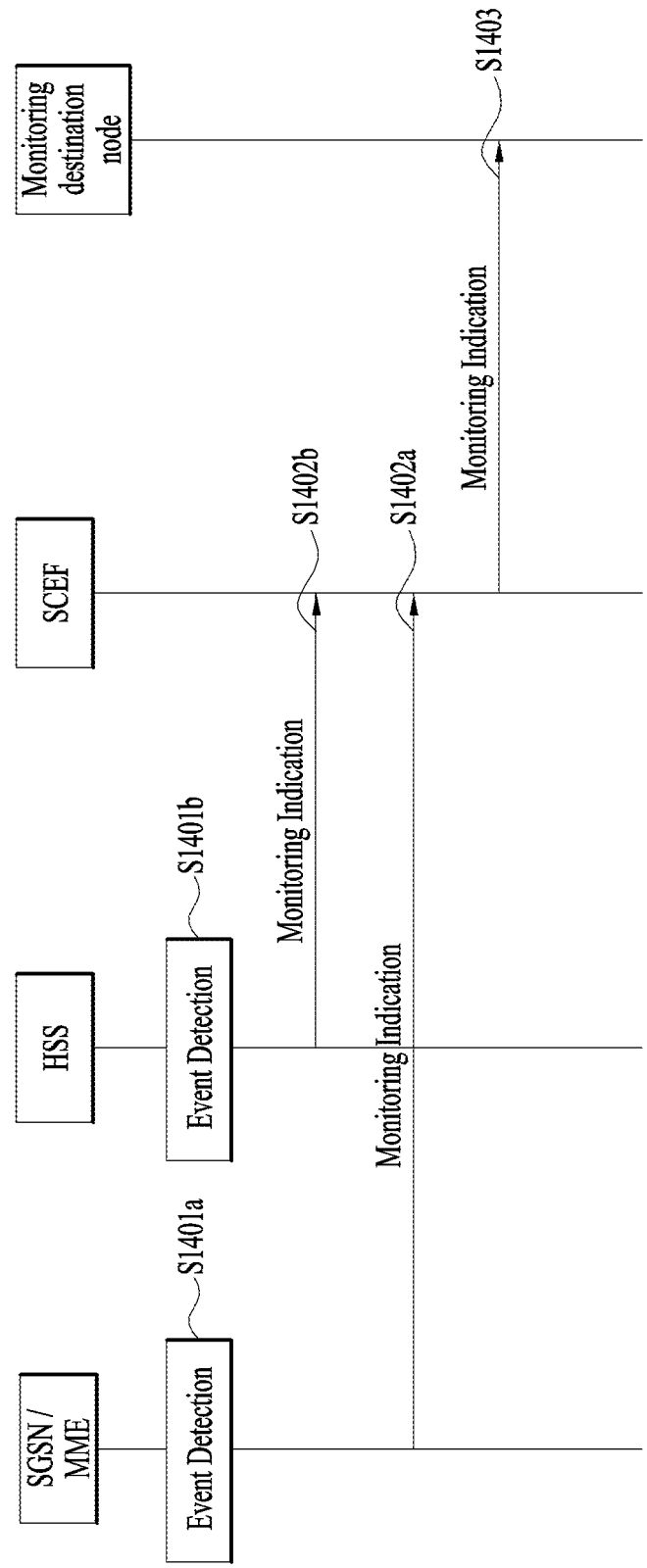

FIG. 14 shows Flow for reporting monitoring events. In step S1401, A monitoring event is detected by SGSN/MME or by the HSS. In step S1402, The SGSN/MME or HSS sends a Monitoring Indication (IMSI and/or MSISDN, Monitoring Information, SCEF Reference ID) message to the SCEF. In step S1403, The SCEF derives the address of the Monitoring Destination node from its stored context. For reports where UE identities are included the SCEF may need to map those into anonymous identities and stores the mapping for handling any subsequent API requests that may include those anonymous identities. The SCEF sends the Monitoring Indication (UE Identity, Monitoring Information, SCS/AS Reference ID) message to the Monitoring Destination node.

If the SCS/AS desires to delete/replace only some monitoring events, recalling/replacing monitoring as described above may be inefficient. For example, suppose that the SCS/AS has requested multiple times of monitoring or persistent monitoring of loss of connectivity and roaming status among monitoring events for UE-1 and reporting of the monitoring. According to the method proposed above, if the SCS/AS desires to cancel the monitoring as monitoring/reporting of the roaming status for UE-1 is no longer needed, the SCS/AS should send a replace request, providing monitoring configuration-related information about loss of connectivity which has been previously provided for the monitor request. As another example, suppose that the SCS/AS has requested multiple times of monitoring or persistent monitoring of type 1, type 2 and type 3 among monitoring events for UE-1 and reporting of the monitoring. Herein, type 1, type 2, . . . may correspond to various monitoring events described in section 2.2.3. Thereafter, according to the proposed method, if monitoring/reporting of type 2 event for UE-1 is not needed and the SCS/AS desires additional monitoring/reporting of type 4, the SCS/AS should re-provide monitoring configuration-related information about type 1 and type 2 previously provided for the monitoring request along with monitoring configuration-related information about type 4 when the SCS/AS sends a replace request. As can be seen from the examples above, this method causes provision of unnecessary/redundant information. In addition, if monitoring configuration is performed through the HSS, unnecessary interaction with the SGSN/MME may occur. In the first example given above, event detection for the loss of connectivity event is performed by the SGSN/MME, and thus monitoring should be configured for the SGSN/MME. On the other hand, event detection for the roaming status event is performed by the HSS, and thus monitoring is configured only for the HSS. However, when the SCS/AS desires to cancel monitoring of the roaming status, the SCS/AS inevitably provides monitoring configuration for loss of connectivity, sending a replace request. Accordingly, due to the replace request generated from the SCS/AS, the SCEF sends the replace request to the HSS even if there is no change compared to the previous condition, and the HSS receiving the request performs SGSN/MME configuration.

Hereinafter, a monitoring configuration/recall/replacement procedure which may address such inefficiency according to embodiments of the present invention will be described.

Embodiments

Figure 15:
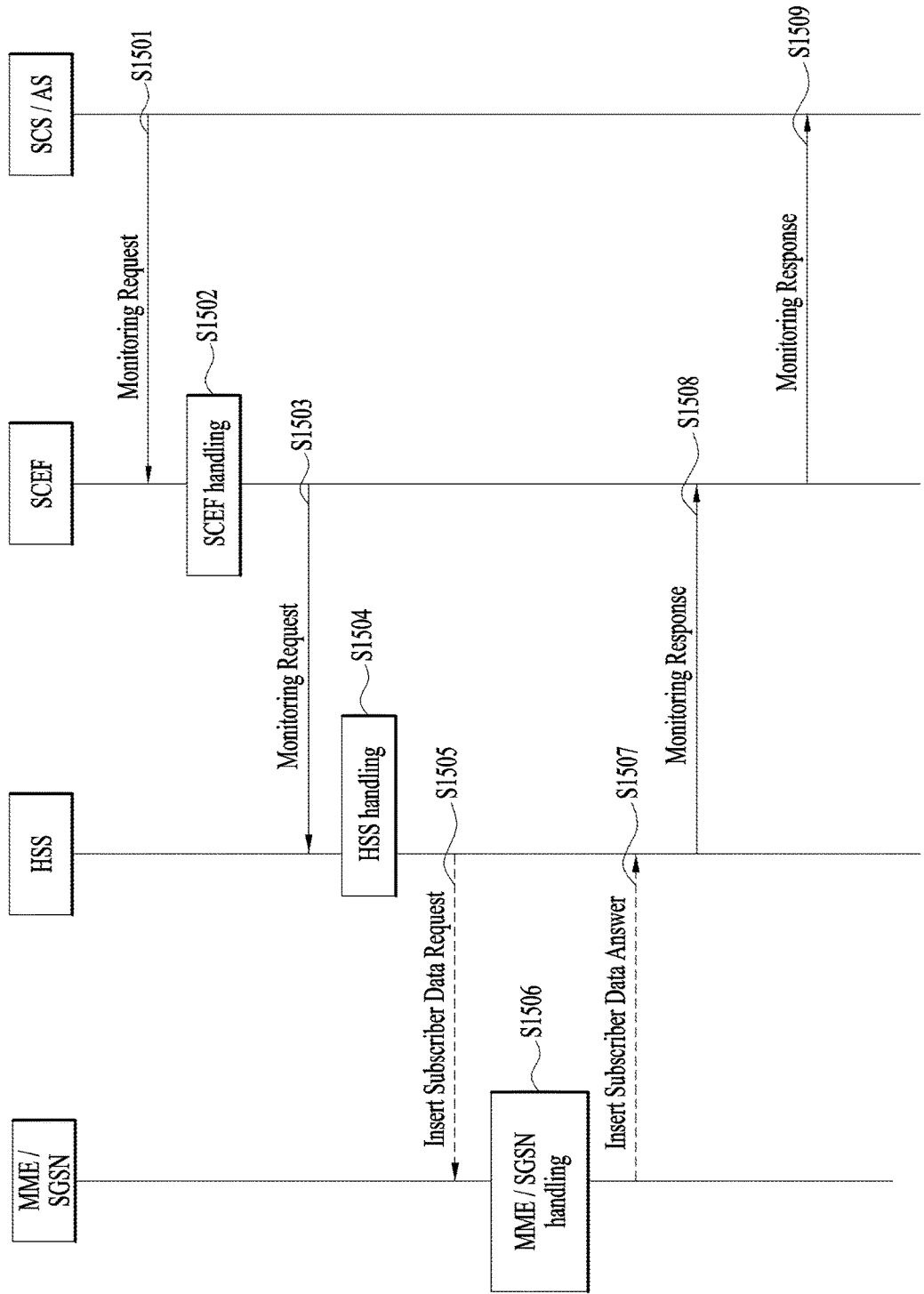
FIGS. 15 to 20 illustrate various embodiments of the present invention.

Referring to FIG. 15, in step S1501, the SCEF may receive a first monitoring request including first information related to monitoring configuration and recall/deletion from the SCS/AS. The first monitoring request may include information indicating whether the request is a request for deletion of all monitoring configurations. In other words, the first monitoring request may include information (e.g., full recall or partial recall) indicating whether the request is a request for deletion of the all monitoring configurations or some of the monitoring configurations of a subscriber (i.e., subscription). In addition, the first monitoring request may include a monitoring type to recall (or reference information indicating a monitoring event type or a monitoring type), which may include a plurality of events to be recalled, and be provided in the form of, for example, a list. One or more mobile devices may belong to the subscriber and the mobile device may be MTC terminal or UE.

Herein, the first information may be an SCS/AS reference ID for monitoring configuration and SCS/AS reference ID for deletion. Alternatively, the first information related to monitoring configuration and deletion may consist of Request Type and Event Action Type. In this case, the monitoring request transmitted from the SCS/AS may include External Identifier(s) or MSISDN(s), an SCS/AS Identifier, SCS/AS Reference ID, Request Type, Monitoring Type, Event Action Type, Max Number of Reports, Monitoring Duration, Priority, Monitoring Destination Address, and Parameters. Parameters are provided by the SCS/AS for the monitoring request. If the Request Type is set to Config_All_Removal, Monitoring Type and the related parameters are not included. For the monitoring event to be removed whose Event Action Type is set to event_remove, the related parameters are not included.

Request Type may be one of Config_All_New indicating that all monitoring configurations are configured, Config_All_Removal indicating deletion of all monitoring configurations, and Config_Update indicating change of only a monitoring event indicated in Event Action Type. Event Action Type may be one of event_add indicating addition of an event, event_remove indicating deletion of an event, and event_modify indicating modification of an event. A detailed description of application of Request Type and Event Action Type will be described with reference to FIGS. 16 and 17 later.

In step S1502, the SCEF may generate second information related to monitoring configuration and deletion, which is generated based on information related to monitoring configuration and deletion. The SCEF checks that the SCS/AS is authorised to send monitoring requests and that the SCS has not exceeded its quota or rate of submitting monitoring requests. If this check fails the SCEF sends a Monitoring Response message with a cause value indicating the reason for the failure condition and the flow stops at this step.

In step S1503, a second monitoring request including second information related to monitoring configuration and deletion may be transmitted to the Home Subscriber Server (HSS). The second monitoring request may be configured to ensure that the HSS recalls the monitoring configuration. In addition, the second monitoring request may include information indicating whether the request is a request for deletion of all monitoring configurations. In other words, the second monitoring request may include information (e.g., full recall or partial recall) indicating whether the request is a request for deletion of all monitoring configurations or a part of the monitoring configurations. In addition, the second monitoring request may include a monitoring type to recall (or reference information indicating a monitoring event type or a monitoring type), which may include a plurality of events to recall coming in the form of, for example, a list. In addition, this ID monitoring request may include External Identifier or MSISDN, SCS/AS Identifier, SCEF Address, SCEF Reference ID, Request Type, Monitoring Type, Event Action Type, Max Number of Reports, Monitoring Duration, Priority, Monitoring Destination Address, and Parameters. Parameters are provided by the SCEF for the monitoring request. The second information may include Reference ID for deletion.

The monitoring deletion related to the first information or the second information may be applied before monitoring configuration is applied. The HSS receiving the first information or the second information or the MME/SGSN receiving the information from the HSS should apply the monitoring configuration after deleting a corresponding monitoring event. Otherwise, when the existing configuration of a monitoring event of the same type is to be replaced with a new configuration, a monitoring configuration is configured first and then the monitoring configuration of the same type is deleted. Thereby, both a valid monitoring configuration and an invalid monitoring configuration may be maintained.

HSS verifies the monitoring request information. If this check fails the HSS sends a Monitoring Response message with a cause value indicating the reason for the failure condition to the SCEF. The SCEF sends a Monitoring Response message with a cause value indicating the reason for the failure condition and the flow stops at this step. The HSS stores parameters provided by the SCEF.

In step S1504, the HSS verifies the monitoring request information. If this check fails the HSS sends a Monitoring Response message with a cause value indicating the reason for the failure condition to the SCEF. The SCEF sends a Monitoring Response message with a cause value indicating the reason for the failure condition and the flow stops at this step. The HSS stores parameters provided by the SCEF.

In step S1505, if a serving node needs to be involved, the HSS sends an Insert Subscriber Data Request message (Parameters) to MME and/or SGSN. Parameters are provided by the HSS for the monitoring request. In step S1506, if it is a one-time request the SGSN/MME perform any necessary actions to obtain the monitoring information. If it is a request for continuous monitoring, the SGSN/MME stores parameters provided by the HSS. In step S1507, the SGSN/MME sends an Insert Subscriber Data Answer (Parameters, Cause) message to the HSS.

In step S1508, the HSS sends a Monitoring Response (IMSI and/or MSISDN, Parameters, Cause) message to the SCEF. In step S1509, if it is not a onetime request, the SCEF stores a monitoring context identified by the IMSI and/or MSISDN and the SCEF Reference ID. The SCEF sends a Monitoring Response (Monitoring Information, SCEF Reference ID, Parameters, Cause) message to the SCS/AS. Parameters are provided as for the related Monitoring Request procedure.

Hereinafter, a detailed description will be given of application of Request Type and Event Action Type with reference to FIGS. 16 and 17.

Figure 16:
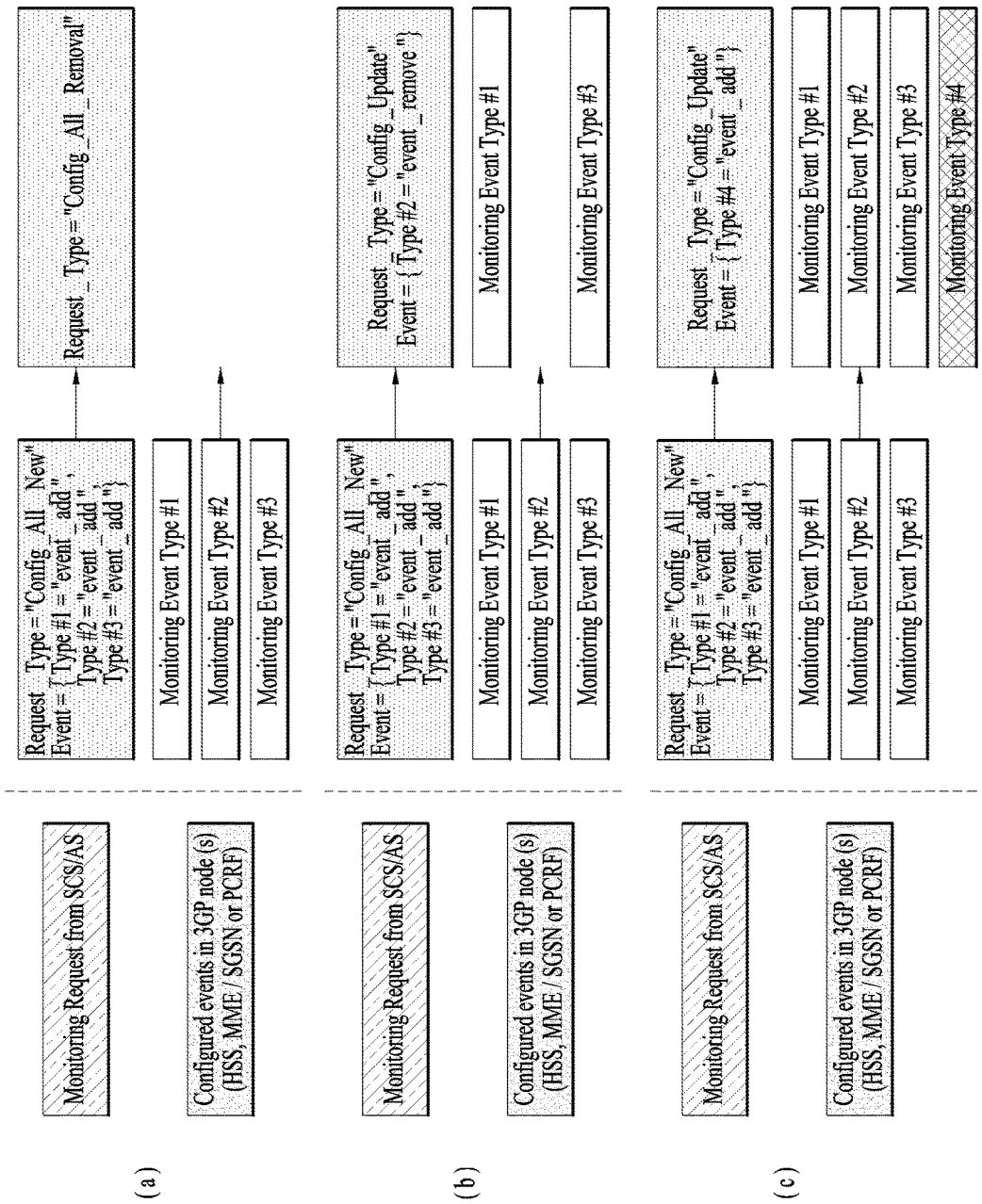

FIG. 16(*a*) illustrates a case where Request Type set to Config_All_New with Event Action Type set to event_add for types 1, 2 and 3 is set to Config_All_Removal. In this case, all preconfigured monitoring event types 1, 2 and 3 are deleted. FIG. 16(*b*) illustrates a case where Request Type is set to Config_Update and event_remove is requested for monitoring type 2 when monitoring types 1, 2 and 3 are configured by Config_All_New. As a result, the monitoring configuration of monitoring event type 2 is deleted. FIG. 16(*c*) illustrates a case where event_add is requested for monitoring type 4 with Request Type set to Config_Update when monitoring types 1, 2 and 3 are configured by Config_All_New. As a result, a monitoring configuration of monitoring event type 4 is configured.

Figure 17:
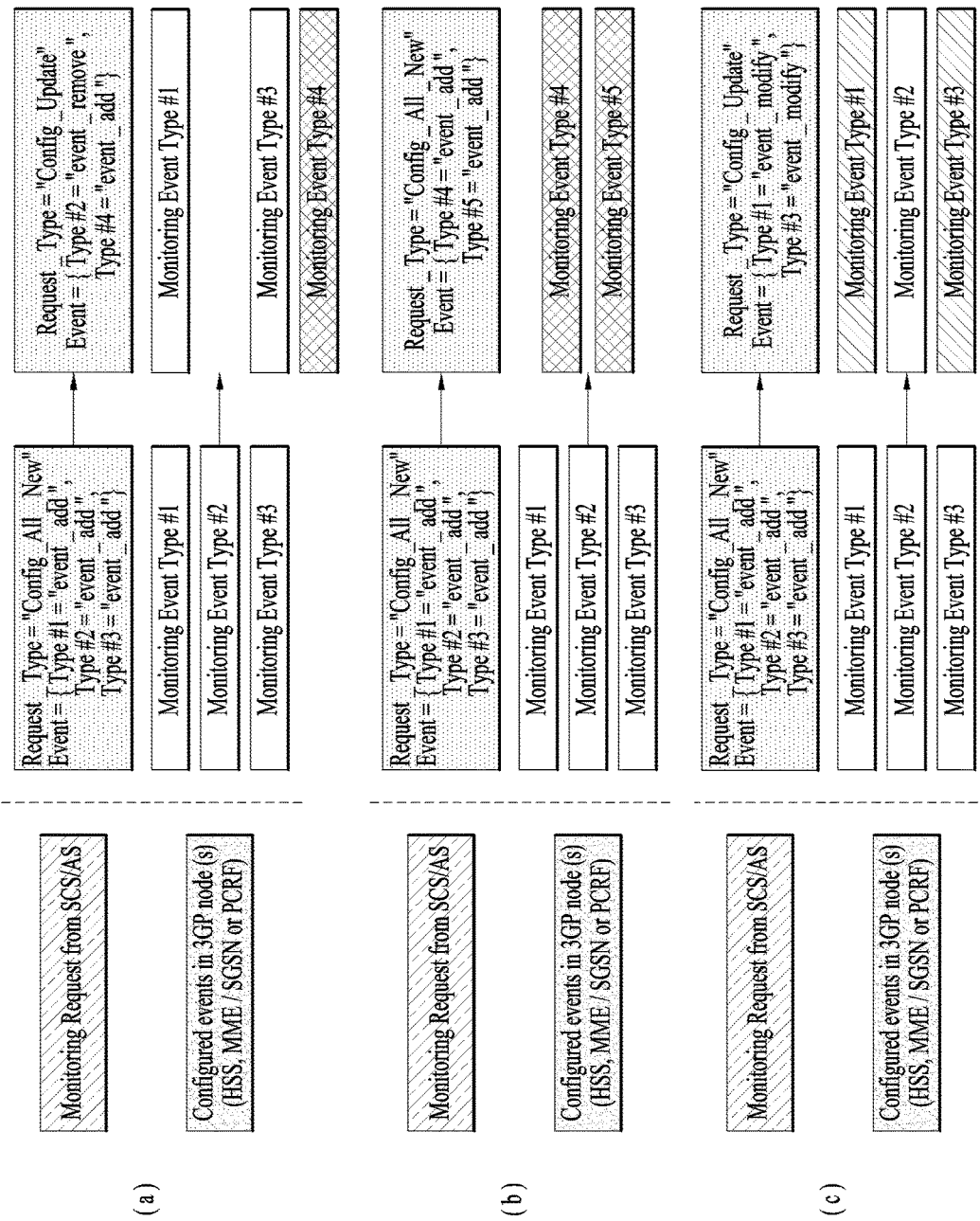

Similarly, FIG. 17(*a*) illustrates a case where monitoring event type 4 is configured, and monitoring event type 2 is deleted. FIG. 17(*b*) illustrates a case where new monitoring event types 4 and 5 are configured. FIG. 17(*c*) illustrates modifying/changing monitoring event types 1 and 3.

Hereinafter, a monitoring procedure according to an embodiment of the present invention will be described with reference to FIGS. 18 and 19.

Figure 18:
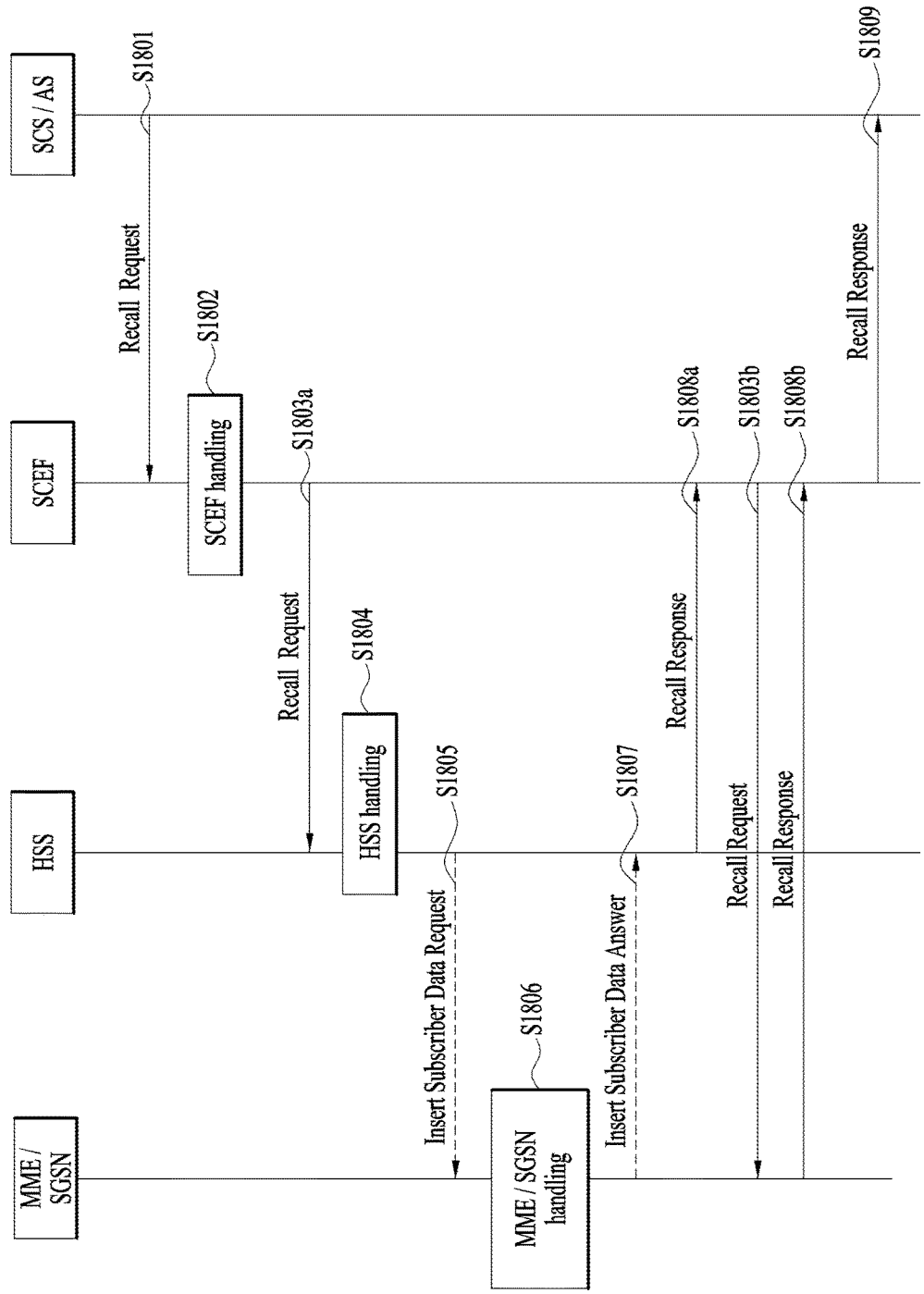

Referring to FIG. 18, in step S1801, the SCS/AS may transmit a Recall Request (External Identifier(s) or MSISDN(s), SCS/AS Identifier, SCS/AS Reference ID) to the SCEF. The Recall Request may explicitly/implicitly/ suggestively include one of the following pieces of information.

a) Information indicating whether the recall request is a request for recall of all monitoring configurations or a request for recall of some monitoring configurations (e.g., full recall or partial recall)

b) A monitoring type to be recalled (or reference information indicating a monitoring event type or a monitoring type). Since there may be multiple events to be recalled, at least one monitoring type may be provided in the form of, for example, a list.

c) A monitoring type which is not desired to be recalled (or reference information indicating a monitoring event type or a monitoring type). Since there may be multiple events to be recalled, at least one monitoring type may be provided in the form of, for example, a list.

d) Information about an action to be performed when a monitoring event for which recall has been requested is detected while recall is being performed. This information may indicate that reporting should be performed or that reporting should not be performed. However, embodiments of the present invention are not limited thereto. The information may relate to various actions. For example, the information may indicate that reporting shall not be performed, but the restrict operation according to detection of an event shall be performed for a UE. Thereby, a node to detect monitoring may perform a corresponding operation.

For full recall, a monitoring type list to be recalled may not be included. For partial recall, information indicating partial recall may not be included and only a monitoring type to be recalled may be included. In this case, subsequent nodes (SCEF, HSS, SGSN/MME) may infer that some or all monitoring events in the monitoring configuration context/ DB thereof will be deleted.

The aforementioned message may contain Recall. Alternatively, the same message may be used for Recall Request and Replace Request and include information about a kind/ type to be requested (whether the request is Recall Request or Replace Request).

In step S1802, the SCEF may recognize, based on the message received from the SCS/AS, that the request is a recall request and recognize whether the recall request is a full recall request or a partial recall request. If the request is a partial recall request, deletion of only a monitoring type to be recalled is performed/determined. If the request is a full recall request, deletion of all monitoring configurations is performed/determined.

In step S1803*a*, if monitoring event(s) to be recalled are configured in the HSS (or through the HSS), the SCEF sends a Recall Request (External Identifier or MSISDN, SCS/AS Identifier, SCEF Address, SCEF Reference ID) message to the HSS. In this case, the additional information described in step 1 may be included.

In step S1803*b*, if the monitoring event(s) are directly configured for the SGSN/MME by the SCEF, the SCEF sends a Recall Request (SCEF Address, SCEF Reference ID) message to the SGSN/MME. In this case, the additional information described in step 1 may be included.

In step S1804, the HSS may recognize, based on the message received from the SCEF, that the request is a recall request and that the recall request is a full recall request or a partial recall request. If the request is a partial recall request, deletion of only a monitoring type to be recalled is performed/determined. If the request is a full recall request, deletion of all monitoring configurations is performed/determined.

In step S1805, if monitoring contexts need to be deleted from serving node(s) (i.e., SGSN and/or MME), the HSS sends an Insert Subscriber Data Request message to MME and/or SGSN. The included parameters indicate which monitoring type and configuration is to be deleted. Additionally, the message may include information indicating whether the deletion request is a full recall request or a partial recall request.

If deletion of the monitoring context is not needed for the serving node(s), the HSS does not transmit the message to the SGSN/MME.

In step S1806, the SGSN/MME performs any necessary actions. If the request is a partial recall request, deletion of only a monitoring type to recall is performed/determined. If the request is a full recall request, deletion of all monitoring configurations is performed/determined.

In step S1807, the SGSN/MME sends an Insert Subscriber Data Answer (Cause) message to the HSS, indicating whether the deletion was successful. When the message is transmitted to the HSS, the message may additionally include deleted monitoring type(s) information.

In step S1808*a*, the HSS sends a Recall Response (IMSI and/or MSISDN, Cause) message to the SCEF. When the message is transmitted to the SCEF, the message may additionally include deleted monitoring type(s) information.

In step S1808*b*, the SGSN/MME sends a Recall Response (SCEF Reference ID, Cause) message to the SCEF. When the message is transmitted to the SCEF, the message may additionally include deleted monitoring type(s) information.

In step S1809, the SCEF sends a Recall Response (SCS/ AS Reference ID, Cause) message to the SCS/AS. When the message is transmitted to the SCS/AS, the message may include deleted monitoring type(s) information.

Figure 19:
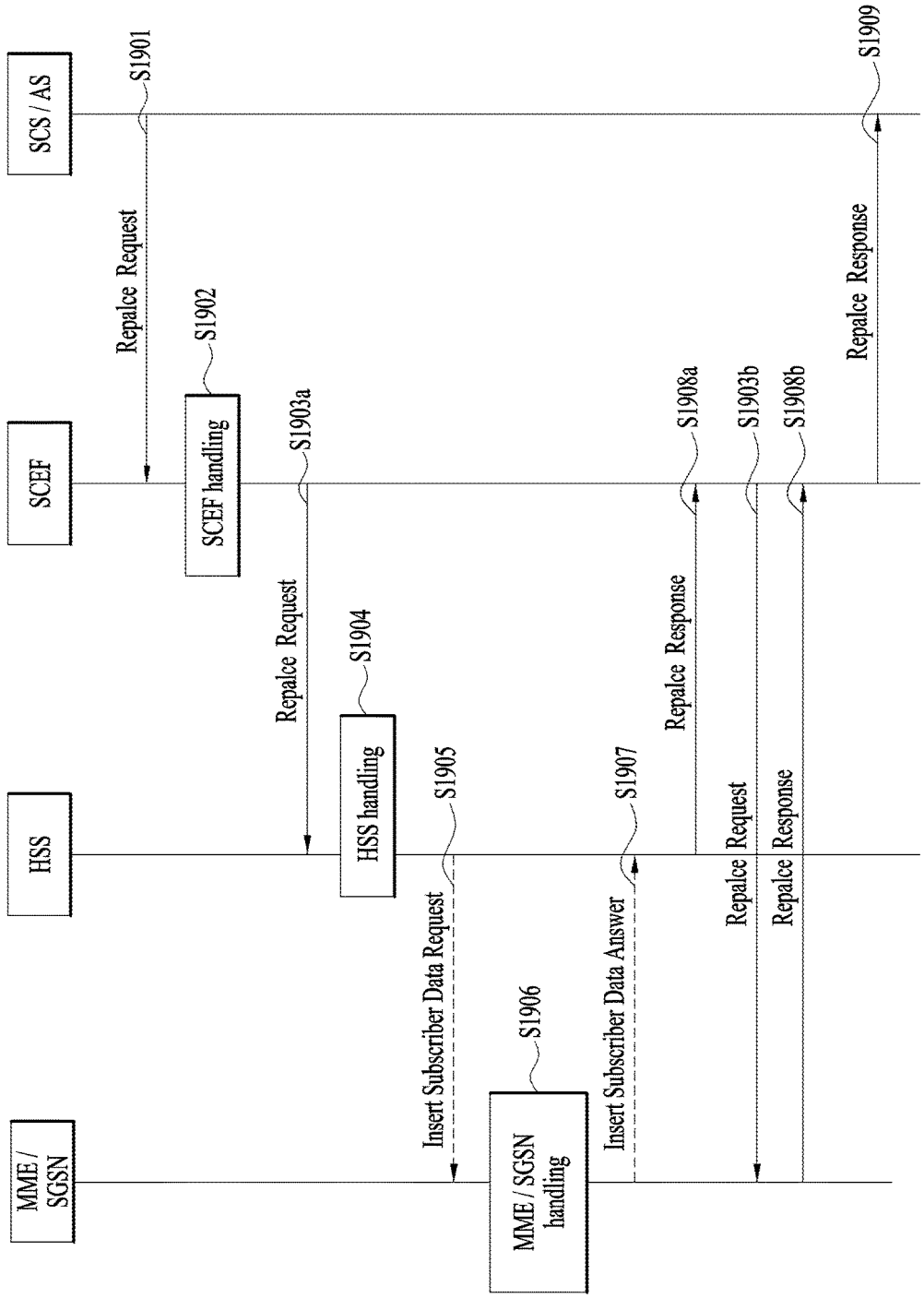

FIG. 19 illustrates a procedure related to monitoring replace. Referring to FIG. 19, in step S1901, the SCS/AS sends a Replace Request (External Identifier(s) or MSISDN(s), SCS/AS Identifier, SCS/AS Reference ID, Parameters, SCEF Reference ID) message to the SCEF. Parameters are provided by the SCS/AS for the Replace Request. The Replace Request may explicitly/implicitly/ suggestively include one of the following pieces of information. In the description of FIG. 19 and throughout the specification, Replace may refer to at least one of recalling a monitoring configuration (or monitoring event/type), modifying/changing the monitoring configuration (or monitoring event/type), and adding a monitoring configuration.

1) Information indicating whether the Replace Request is a Replace Request for all monitoring configurations or a Replace Request for some monitoring configurations (e.g., full replace or partial replace)

2) A monitoring type to be recalled (or reference information indicating a monitoring event type or monitoring type). Since there may be multiple events to be recalled, at least one monitoring type may be provided in the form of, for example, a list.

3) A monitoring type which is not desired to be recalled (or reference information indicating a monitoring event type or a monitoring type). Since there may be multiple events to be recalled, at least one monitoring type may be provided in the form of, for example, a list.

4) A monitoring type (or reference information indicating a monitoring event type or a monitoring type) of a monitoring event having content/details of configuration to be changed/modified among the previously configured monitoring events. Since there may be multiple events to be changes/modified, at least one monitoring type may be provided in the form of, for example, a list.

5) Regarding item 4), changed/modified information for each monitoring event may include not only the changed/modified information but also maintained information.

6) A new added monitoring type (or reference information indicating a monitoring event type or a monitoring type). Since there may be multiple events to be added, at least one new added monitoring type may be provided in the form of, for example, a list.

7) Regarding item 6), configuration information (or a configuration parameter or information of all or part of Parameters) about each monitoring event.

8) Information about an action to be performed when a monitoring event for which a recall has been requested is detected while recall is being performed. This information may indicate that reporting should be performed or that reporting should not be performed. However, embodiments of the present invention are not limited thereto. The information may relate to various actions. For example, the information may indicate that reporting shall not be performed, but restrict operation according to detection of an event shall be performed for a UE. Thereby, a node to detect the monitoring may perform a corresponding operation.

9) Information indicating that there is a monitoring event to recall

10) Information indicating that there is a monitoring event to change/modify

11) Information indicating that there is a monitoring event to add

For example, if monitoring type 1 and monitoring type 2 are configured, and monitoring type 1 needs to be deleted and monitoring type 3 needs to be added, information indicating partial replace, information indicating that monitoring type 1 will be recalled and monitoring type 3 will be added, and related configuration parameters may be included. As another example, when monitoring type 1 and monitoring type 2 are already configured, if both monitoring type 1 and monitoring type 2 need to be deleted, and monitoring type 3 and monitoring type 4 need to be added, information indicating full replace and configuration parameters for monitoring type 3 and monitoring type may be included. By providing the information in various other forms/combinations, subsequent nodes (SCEF, HSS, SGSN/MME) may infer that some or all events of the monitoring events in the monitoring configuration context/DB thereof will be deleted, that some or all events of the monitoring events in the monitoring configuration context/DB thereof will be modified/changed, or that new events will be added.

In step S1902, the SCEF may recognize, based on the message received from the SCS/AS in step 1901, that the request is a Replace Request and recognize whether the Replace Request is a full Replace Request or a partial Replace Request. Based on the information received in step S1901, the corresponding operation is performed/determined for monitoring event(s) which need to be recalled, modified/changed. It is efficient in terms of management of monitoring configuration to perform recall prior to event configuration, which needs to be added for full Replace Request or partial Replace Request for the following reasons. In the case where event configuration that needs to be added is performed before recall is performed, i) if an event for a configuration to be recalled happens while configuration is being performed, a node sensing the event reports the event, but this reporting is meaningless since the SCS/AS does not desire reporting on the event anymore. Thereby, network resources are wasted according to signaling transmission for reporting. ii) If configuration needs to be performed for the same event with a configuration value different from the existing configuration value, the existing configuration is deleted and configuration may be performed with the new configuration value. In this case, if an event for the previous configuration value happens while configuration is being performed using the new configuration value, a node this sensing the event reports the event. In this case, the SCS/AS may receive an incorrect report.

For example, for an event corresponding to loss of connectivity, the SCS/AS may request that a monitoring event including a Maximum Detection Time indicating the maximum time value for detecting loss of connectivity of the UE be configured. In this case, configuration is performed with the Maximum Detection Time initially set to 1 hour. Thereafter, configuration for previously configured loss of connectivity may be deleted while the Maximum Detection Time is set to 2 hours to request that configuration for loss of connectivity be performed. While the network performs configuration with the Maximum Detection Time set to 2 hours, the MME may sense occurrence of loss of connectivity event according to previous configuration with Maximum Detection Time=1, and report the event to the SCS/AS. Thereby, the SCS/AS erroneously considers that the report is about loss of connectivity corresponding to 2 hours.

In step S1903*a*, if monitoring event(s) to be replaced are configured in the HSS (or through the HSS), the SCEF sends a Replace Request (External Identifier or MSISDN, SCS/AS Identifier, SCEF Address, SCEF Reference ID) message to the HSS. In this case, the additional information described in step S1901 may be included.

In step S1903*b*, if monitoring event(s) to be replaced are directly configured for the SGSN/MME by the SCEF, the SCEF sends a Replace Request (SCEF Address, SCEF Reference ID) message to the SGSN/MME. In this case, the additional information described in step 1 may be included.

In step S1904, the HSS may recognize, based on the message received from the SCEF in step 1903*a*, that the request is a Replace Request and recognize whether the Replace Request is a full replace request or a partial Replace Request. Based on the information received in step S1903*a*, a corresponding operation is performed/determined for monitoring event(s) that need to be recalled, modified/changed or added.

In step S1905, if monitoring contexts need to be deleted/updated/added in serving node(s) (i.e., SGSN and/or MME), the HSS sends an Insert Subscriber Data Request message to MME and/or SGSN. The included parameters indicate which monitoring type and configuration is to be deleted/ updated/added. The message may further include information indicating whether the Replace Request is a full Replace Request or a partial Replace Request.

If the serving node(s) do not need deletion/change/addition of monitoring contexts, the HSS does not transmit their message to the SGSN/MME.

In step S1906, the SGSN/MME perform any necessary actions. Based on the information received in step 1905, a corresponding operation is performed for the monitoring event(s) which need to be recalled, modified/changed, or added.

In step S1907, the SGSN/MME sends an Insert Subscriber Data Answer (Cause) message to the HSS, indicating whether the deletion was successful. The message transmitted to the HSS may additionally include deleted/changed/added monitoring type(s) information.

In step S1908a, the HSS sends a Replace Response (IMSI and/or MSISDN, Cause) message to the SCEF. When the message is transmitted to the SCEF, the message may additionally include deleted/changed/added monitoring type(s) information.

In step S1908b, the SGSN/MME sends a Replace Response (SCEF Reference ID, Cause) message to the SCEF. When the message is transmitted to the SCEF, the message may additionally include deleted/changed/added monitoring type(s) information.

In step S1909, the SCEF sends a Replace Response (SCS/AS Reference ID, Cause) message to the SCS/AS. When the message is transmitted to the SCS/AS, the message may additionally include deleted/changed/added monitoring type(s) information.

Descriptions have been given above focusing on the HSS and the SGSN/MME. the same principle is applicable to monitoring configuration in the SGSN/MME (namely, a procedure of the SCEF directly configuring monitoring for the SGSN/MME) and a monitoring configuration procedure of the PCRF in the same/similar manner.

Figure 20:
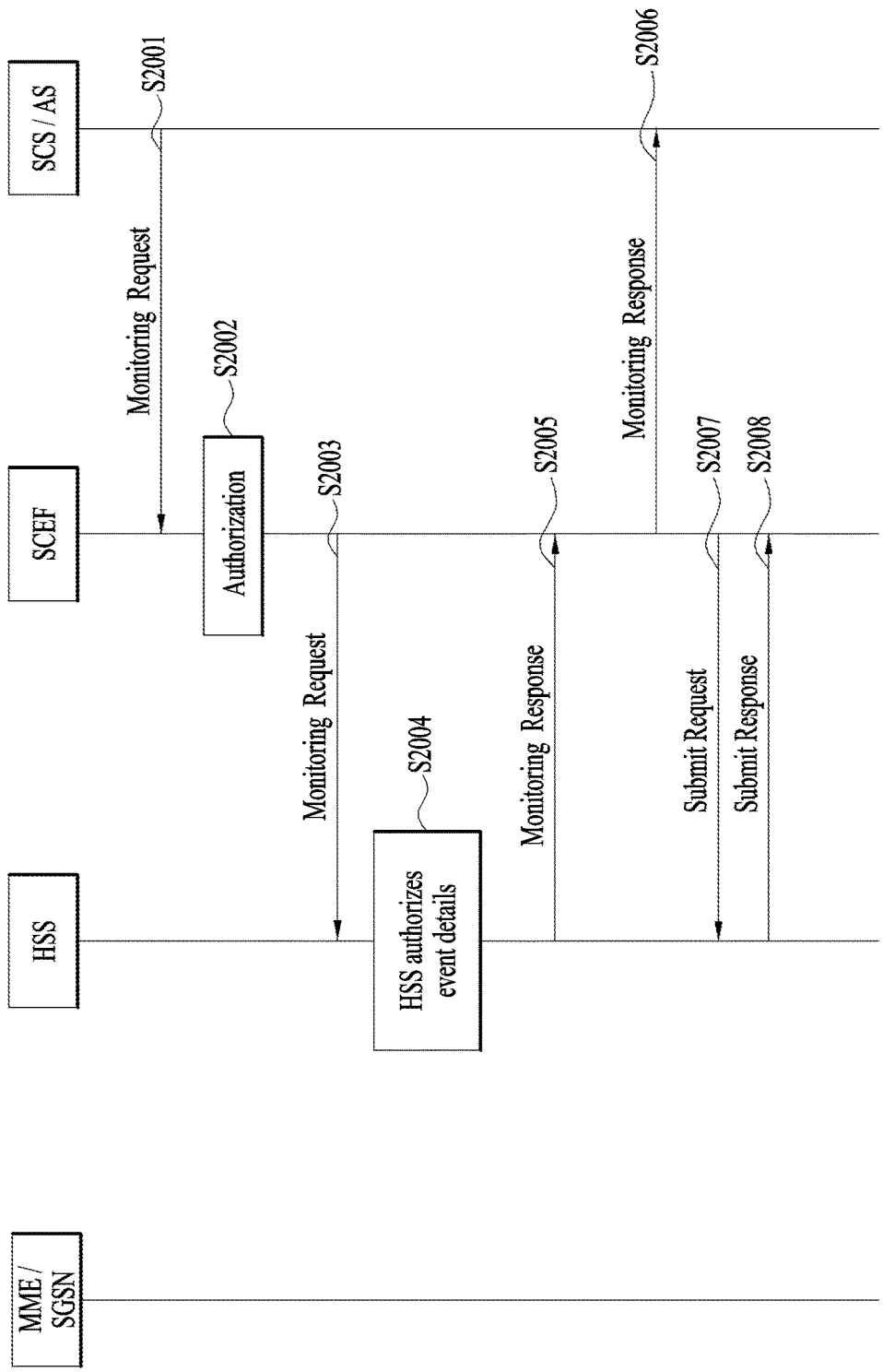

FIG. 20 is a diagram illustrating a monitor related procedure according to another embodiment of the present invention. Description of FIG. 20 will be given based on the description of FIG. 9. Accordingly, for details other than those described below regarding the procedure of FIG. 20, description of FIG. 9 is applied. The embodiment of FIG. 20 is intended to address an issue raised in a case where the UE receives a service of a serving node without the T6 interface, and thus cannot perform MTC monitoring configuration using the T6 interface. This issue is likely to be raised in an MTC UE (e.g., a logistics transport truck) which roaming frequently occurs. In addition, in the MTC business, a large quantity of MTC UEs are manufactured as desired by a specific operator and sold in other countries. Thereby, MTC UEs may be used in a situation of persistent roaming, and thus the same issue may be raised.

To address this issue, in step S2005 of FIG. 20, the HSS transmits, to the SCEF, a response indicating absence of a serving node for a UE for which monitoring configuration is being requested. If the HSS recognizes that there is a serving node available to the UE, but the serving node is not provided with a T6 interface with the SCEF (based on, for example, pre-stored DB), the SCEF transmits, to the SCEF, a response announcing that there is no serving node (or the serving node is not provided with the T6 interface).

In step S2007, the SCEF transmits a monitoring request to the HSS. This request causes the HSS to store monitoring events in the subscriber information (or context) of the UE and thus to perform the operation of Option A in FIG. 9. Thereafter, when the HSS recognizes that a serving node is available to the UE (for example, as the serving node performs an operation of Update Location Request for the HSS), the HSS performs monitoring configuration for the serving node. If the Tx interface is not provided, there is an available serving node and thus monitoring configuration is performed for this available serving node. Additionally, when a serving node becomes available, the SCEF may be notified of this fact. This operation may be performed only when the SCEF and a serving node having the T6 interface become available.

When the SCEF transmits a monitoring request to the HSS, the request may carry monitoring event configuration details (e.g., Monitoring Event ID) or may not carry the monitoring event configuration details. In the latter case, since transmission has been performed in step S2003, it is assumed the HSS temporarily stores the details.

If monitoring configuration is performed based on Option B of FIG. 9, but the SCEF recognize that there is no serving node available to the UE or that there is an available serving node, but Tx interface is not present (This information may be provided by the HSS.—In this case, the HSS provides this information in step S2005 of FIG. 20, or the information may be recognized through the pre-stored DB in the SCEF.—In this case, the HSS provides the address information on the serving node in step S2005 of FIG. 20). Upon receiving a monitoring request or update of the existing monitoring request from the SCS/AS regarding the UE, the SCEF is that the HSS perform the operation of Option A. For example, in step S2003 of FIG. 9 or 20, when a monitoring request is transmitted to the HSS, it is (explicitly or implicitly) requested that the HSS perform the operation of Option A. The SCEF may recognize that there is no serving node available to the UE based on various methods including step S2005 of FIG. 20, step S911b of FIG. 9, or an event detected by the HSS and notified to the SCEF. In the description above, step S2006 may be performed after step S2008.

Figure 21:
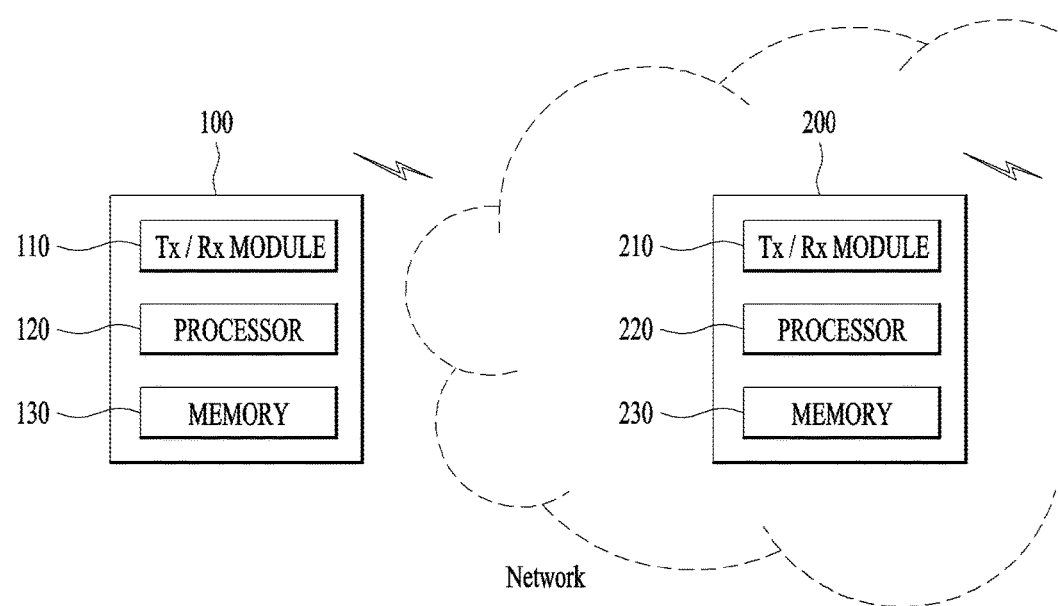
FIG. 21 illustrates a node according to an embodiment of the present invention.

FIG. 21 illustrates configuration of a UE and a network node according to a preferred embodiment of the present invention.

Referring to FIG. 21, the UE 100 according to the present invention may include a transceiver 110, a processor 120, and a memory 130. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 21, the the network node 200 according to the present invention may include a transceiver 210, a processor 220 and a memory 230. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the. present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

As apparent from the above description, the present invention has effects as follows.

According to embodiments of the present disclosure, neither provision nor configuration of unnecessary information is performed. Accordingly, monitoring configuration/recall/replacement may be efficiently performed.

Although embodiments of the present invention described above focusing on the 3GPP system, they are applicable to various mobile communication systems in the same manner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting and receiving a signal related to monitoring by a Service Capability Exposure Function (SCEF) in a wireless communication system, the method comprising:
    receiving a first monitoring request containing first information related to monitoring configuration and deletion from a Service Capability Server/Application Server (SCS/AS); and
    transmitting, to a Home Subscriber Server (HSS), a second monitoring request containing second information related to monitoring configuration and deletion, the second information being generated based on the first information related to the monitoring configuration and deletion,
    wherein the second monitoring request contains information indicating whether the second monitoring request is a request for deletion of all monitoring configuration of a subscriber.

2. The method according to claim 1, wherein the monitoring deletion related to the second information is applied before the monitoring configuration is applied.

3. The method according to claim 1, wherein the monitoring deletion related to the first information is applied before the monitoring configuration is applied.

4. The method according to claim 1, wherein the second monitoring request ensures that the HSS deletes monitoring configuration.

5. The method according to claim 1, wherein the first information related to the monitoring configuration and deletion comprises Request Type and Event Action Type.

6. The method according to claim 5, wherein the Request Type is one of Config_All_New indicating that all monitoring configuration shall be configured, Config_All_Removal indicating all monitoring configuration shall be deleted, and Config_Update indicating that only a monitoring event indicated by the Event Action Type shall be changed.

7. The method according to claim 1, wherein, when the second monitoring request is a request for deletion of all monitoring configuration, the second monitoring request does not contain information on a monitoring event to be deleted.

8. The method according to claim 5, wherein the Event Action Type is one of event_add indicating addition of an event, event_remove indicating deletion of an event and event_modify indicating modification of an event.

9. The method according to claim 1, wherein one or more mobile devices are included in the subscriber.

10. A Service Capability Exposure Function (SCEF) for transmitting and receiving a signal related to monitoring in a wireless communication system, the SCEF comprising:
    a transceiver; and
    a processor,
    wherein the processor is configured to receive a first monitoring request containing first information related to monitoring configuration and deletion from a Service Capability Server/Application Server (SCS/AS), and to transmit, to a Home Subscriber Server (HSS), a second monitoring request containing second information related to monitoring configuration and deletion, the second information being generated based on the first information related to the monitoring configuration and deletion, and
    wherein the second monitoring request contains information indicating whether the second monitoring request is a request for deletion of all the monitoring configuration of a subscriber.

11. The method according to claim 10, wherein one or more mobile devices are included in the subscriber.

12. The SCEF according to claim 10, wherein the monitoring deletion related to the second information is applied before the monitoring configuration is applied.

13. The SCEF according to claim 10, wherein the monitoring deletion related to the first information is applied before the monitoring configuration is applied.

14. The SCEF according to claim 10, wherein the second monitoring request ensures that the HSS deletes monitoring configuration.

15. The SCEF according to claim 10, wherein the first information related to the monitoring configuration and deletion comprises Request Type and Event Action Type.

16. The SCEF according to claim 14, wherein the Request Type is one of Config_All_New indicating that all monitoring configuration shall be configured, Config_All_Removal indicating all monitoring configuration shall be deleted, and Config_Update indicating that only a monitoring event indicated by the Event Action Type shall be changed.

17. The SCEF according to claim 10, wherein, when the second monitoring request is a request for deletion of all monitoring configuration, the second monitoring request does not contain information on a monitoring event to be deleted.

18. The SCEF according to claim 16, wherein the Event Action Type is one of event_add indicating addition of an event, event_remove indicating deletion of an event and event_modify indicating modification of an event.

\* \* \* \* \*